(12) United States Patent
Miyazawa

(10) Patent No.: US 8,238,037 B2
(45) Date of Patent: Aug. 7, 2012

(54) IMAGE PICKUP APPARATUS HAVING ZOOM LENS

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/081,405

(22) Filed: Apr. 6, 2011

(65) Prior Publication Data

US 2011/0249172 A1    Oct. 13, 2011

(30) Foreign Application Priority Data

Apr. 8, 2010    (JP) .................................. 2010-089323

(51) Int. Cl.
*G02B 15/14* (2006.01)
(52) U.S. Cl. .......................... 359/686; 359/683; 359/687
(58) Field of Classification Search .................. 359/676, 359/683, 686, 687
See application file for complete search history.

(56) References Cited

U.S. PATENT DOCUMENTS

| | | | |
|---|---|---|---|
| 7,177,092 B2 | 2/2007 | Satori et al. | |
| 7,206,137 B2 | 4/2007 | Nakatani et al. | |
| 7,573,647 B2 | 8/2009 | Matsumoto et al. | |
| 2008/0049334 A1* | 2/2008 | Shin et al. ..................... | 359/687 |

FOREIGN PATENT DOCUMENTS

JP    63-068807 A    3/1988

* cited by examiner

*Primary Examiner* — Scott J Sugarman
(74) *Attorney, Agent, or Firm* — Canon U.S.A., Inc. IP Division

(57) ABSTRACT

In an image pickup apparatus including an image sensor and a zoom lens configured to form an image on the image sensor, the zoom lens includes, in order from an object side to an image side, a first lens unit having a positive refractive power, a second lens unit having a negative refractive power, a third lens unit having a positive refractive power, and a subsequent lens group including one or more lens units. In the zoom lens, during zooming, the first lens unit is stationary, the third lens unit moves along a locus convex towards the object side, and three or more lens units including the third lens unit and the image sensor move. An optical total length of the zoom lens is longer at a telephoto end than at a wide-angle end.

7 Claims, 21 Drawing Sheets

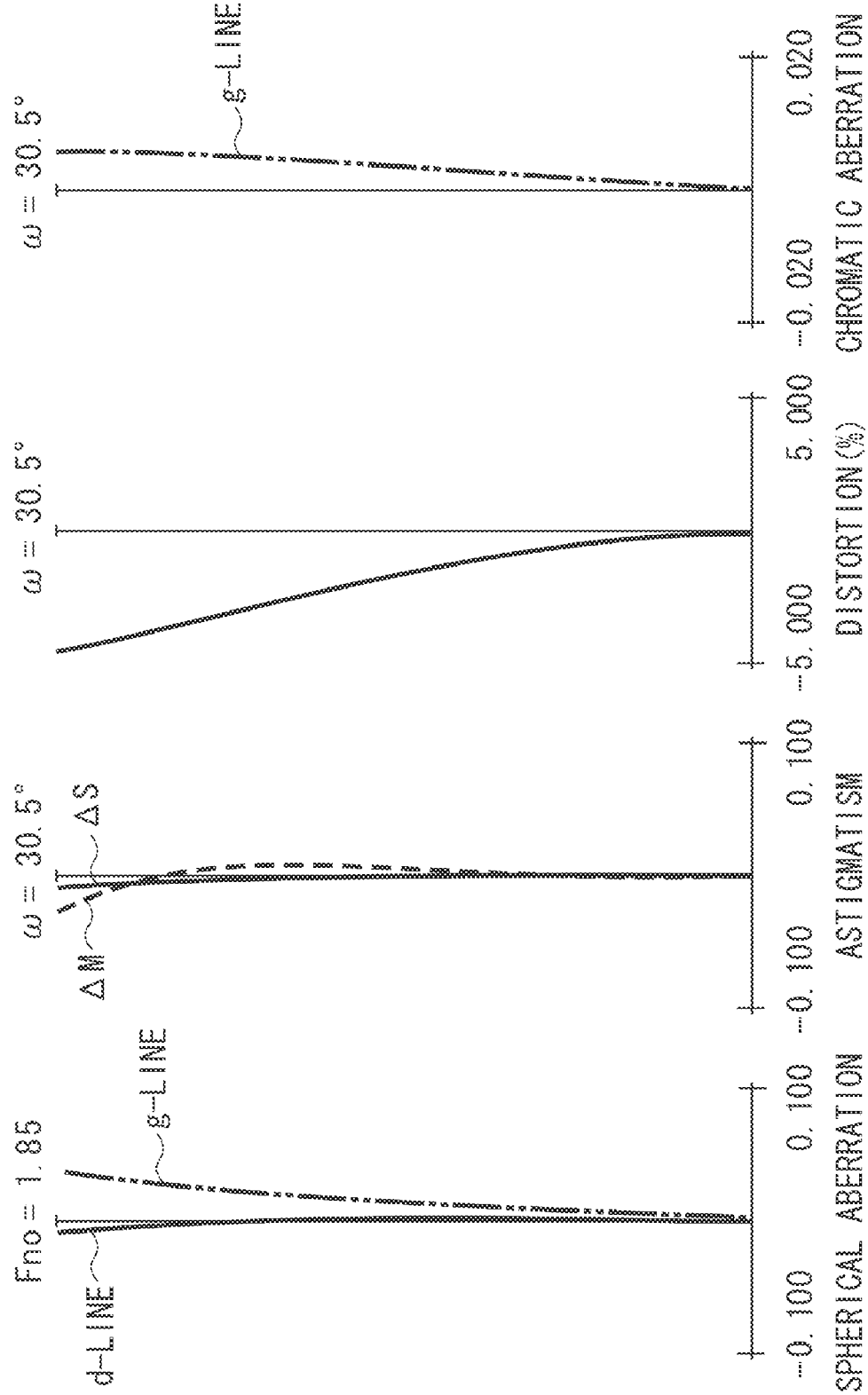

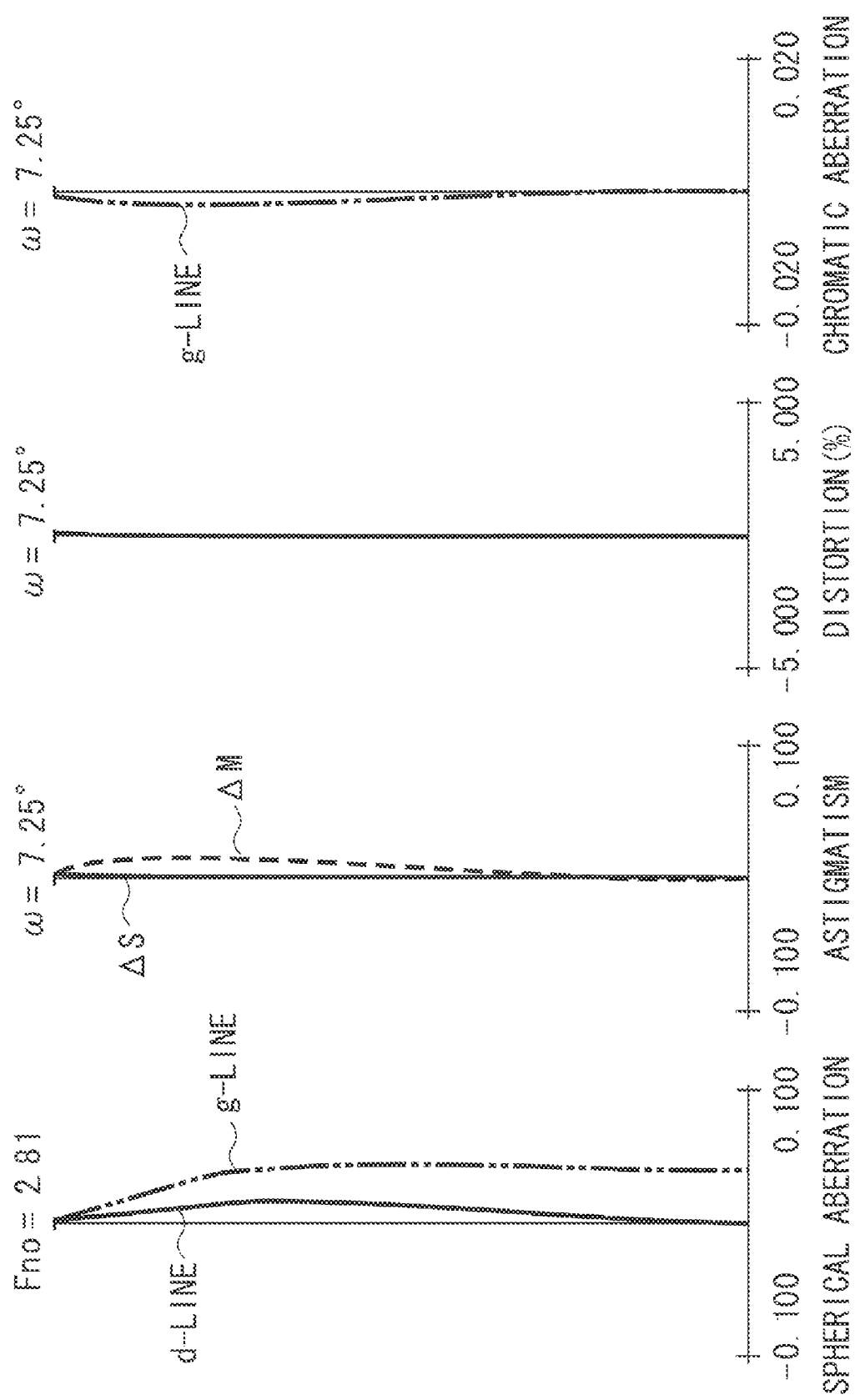

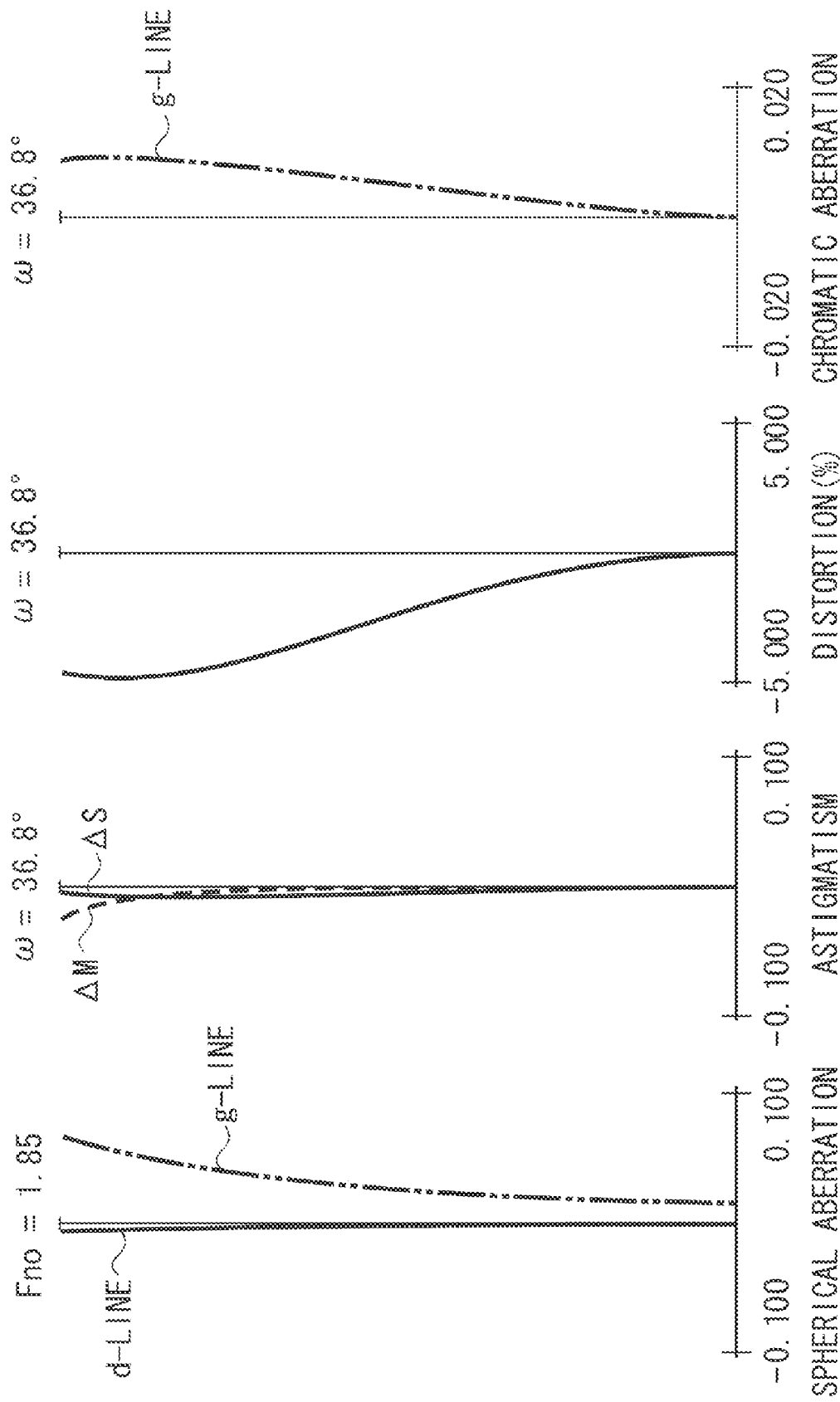

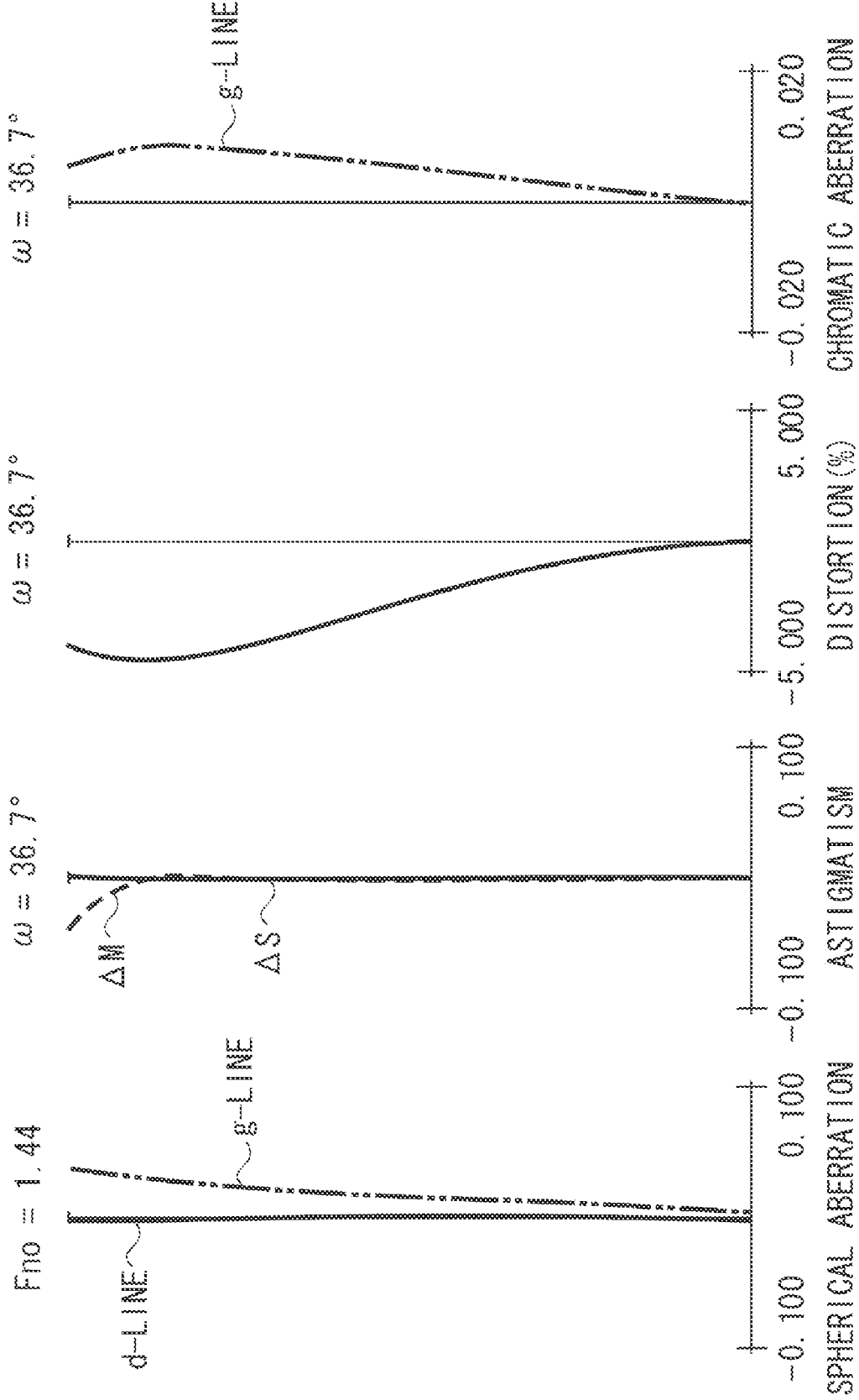

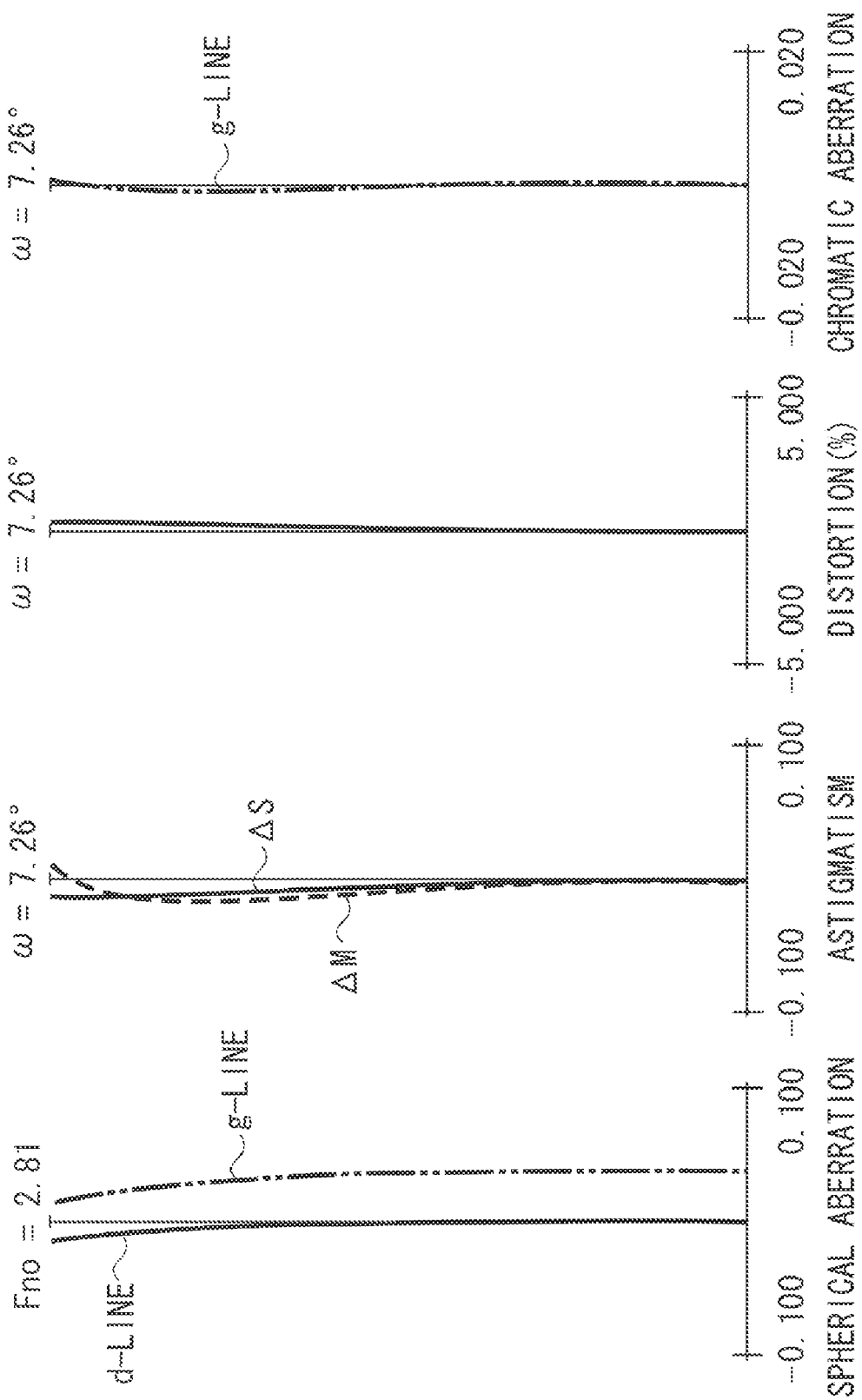

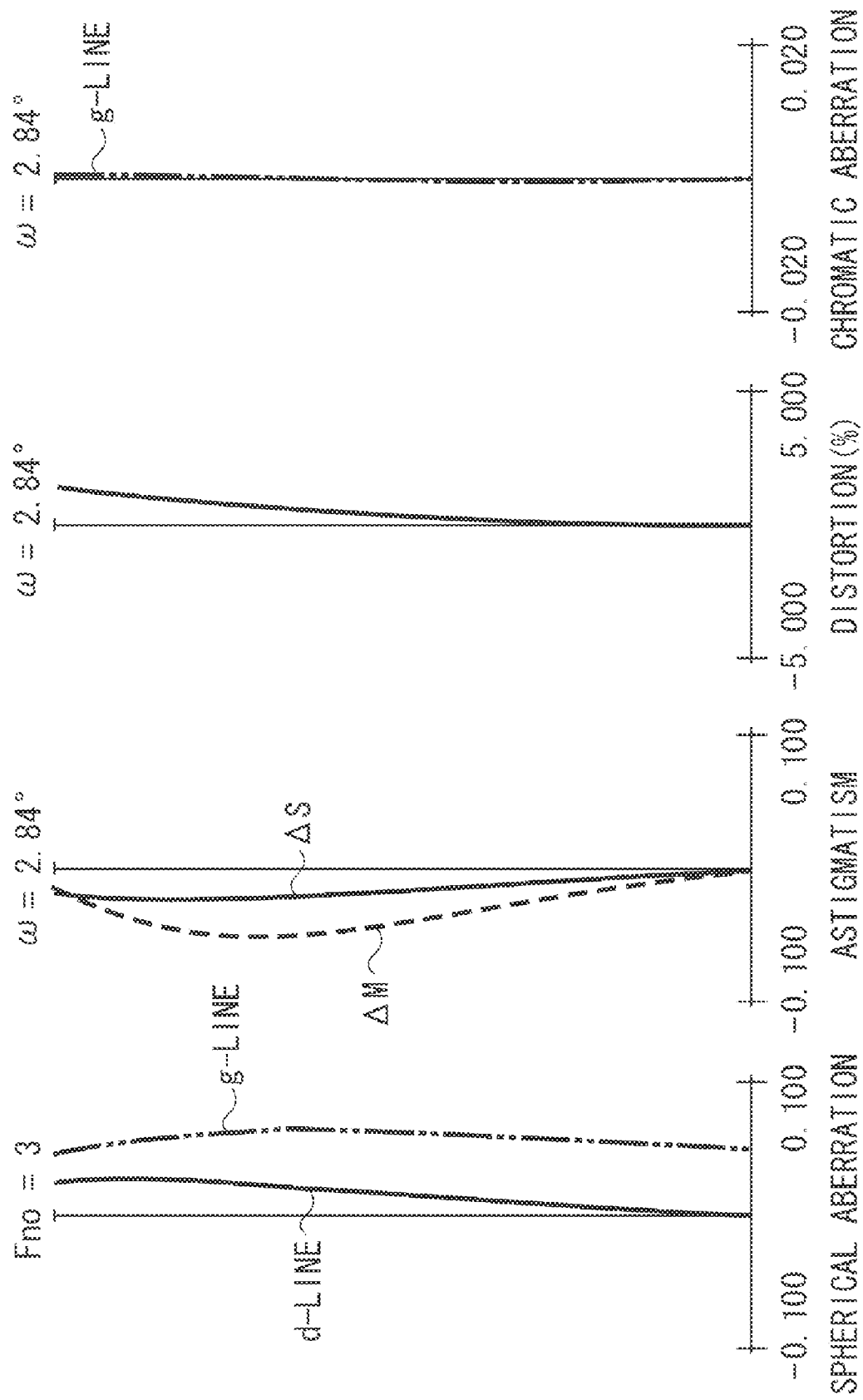

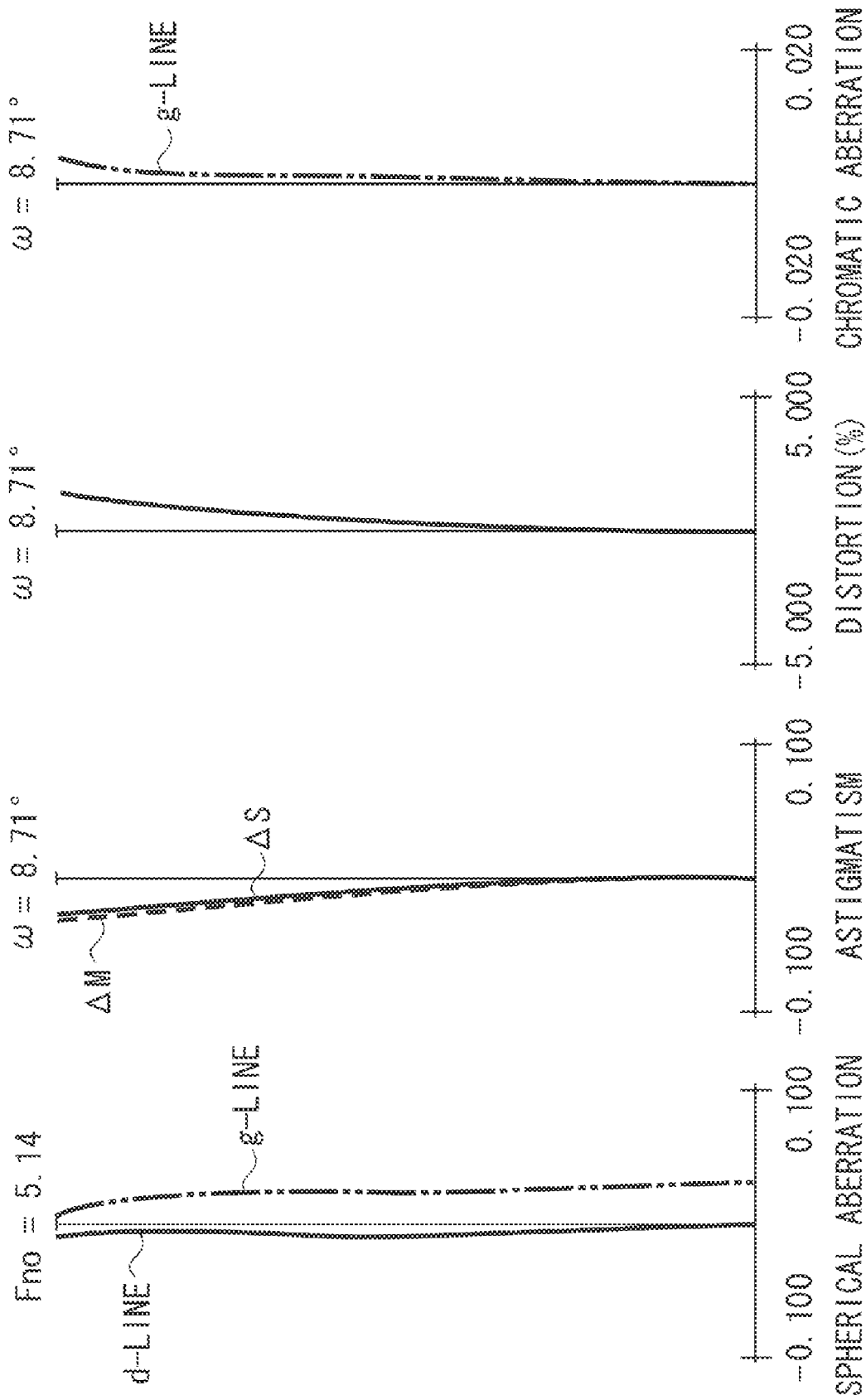

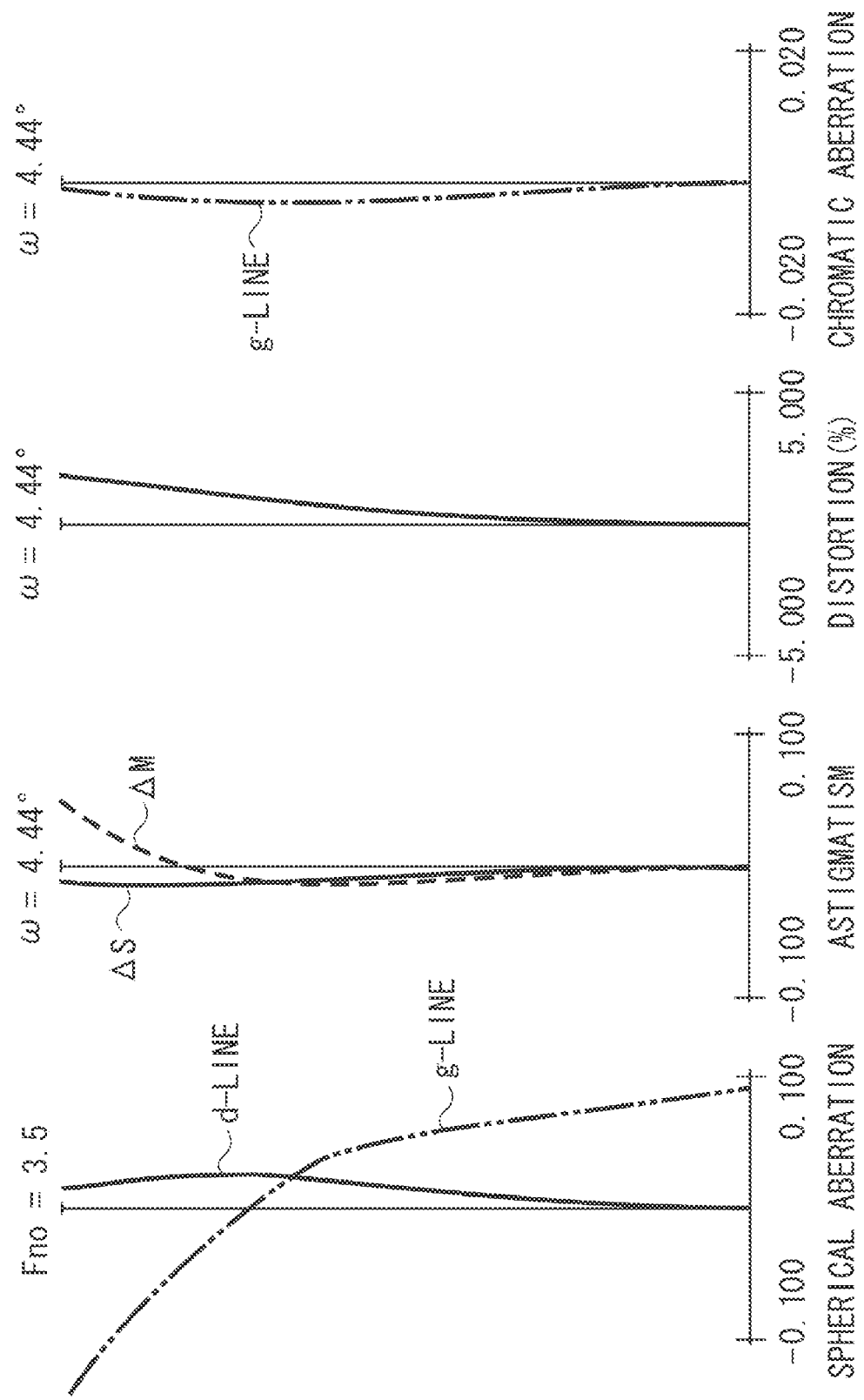

IMAGE PICKUP APPARATUS HAVING ZOOM LENS

BACKGROUND OF THE INVENTION

1. Field of the Invention

The present invention relates to an image pickup apparatus. More specifically, the present invention relates to an image pickup apparatus that uses a solid-state image sensor and a zoom lens.

2. Description of the Related Art

The functions of an image pickup apparatus that uses a solid-state image sensor are continuously being improved. For example, the functions of a camera, such as a video camera, a digital still camera, a broadcast camera, or a monitoring camera, have increased substantially in recent years, while the total size of such an apparatus has become smaller and smaller.

At the same time, market forces demand that newly designed image pickup apparatuses be small and highly efficient. To that end, an optical system (zoom lens) used in an image pickup apparatus like a camera is designed with a small-size zoom lens having a wide angle of view (photographic angle of view) and a high zoom ratio, so that the total size of the optical system is kept compact and small.

As a zoom lens having a wide angle of view and a high zoom ratio, a positive-lead type zoom lens has been used. A known positive-lead type zoom lens includes, in order from the object side to the image side, a first lens unit having a positive refractive power, a second lens unit having a negative refractive power, a third lens unit having a positive refractive power, and a rear lens unit including one or more lenses.

In order to achieve a positive-lead type zoom lens having a wide angle of view in a small-size optical system while preventing a large-diameter front lens, it may be useful to move the first lens unit during zooming. However, if the first lens unit is tilted while moving during zooming, a photographed image may be blurred.

In addition, if a wide-angle converter is installed around the first lens unit, the first lens unit and the wide-angle converter may interfere with each other during zooming. In order to solve this problem, a conventional zoom lens moves an image sensor when the first lens unit is fixed during zooming.

In a zoom lens discussed in Japanese Patent Application Laid-Open No. 63-68807, one lens unit and an image sensor are moved during zooming. In other words, the image sensor is moved according to an image plane that varies during variable magnification. A zoom lens discussed in U.S. Pat. No. 7,573,647 moves the image sensor, and the zoom lens includes a moving lens unit that corrects variation on the image plane. With the configuration like this, the zoom lens discussed in U.S. Pat. No. 7,573,647, in which the first lens unit is fixed during zooming, can achieve substantially the same effect as that implemented by a zoom lens whose first lens unit is moved during zooming.

In addition, U.S. Pat. No. 7,206,137 discusses a small-size positive-lead type zoom lens having a high zoom ratio. In this case, the small-size positive-lead type zoom lens is constituted by four lens units including, in order from the object side to the image side, a first lens unit having a positive refractive power, a second lens unit having a negative refractive power, a third lens unit having a positive refractive power, and a fourth lens unit having a positive refractive power. Furthermore, a zoom lens discussed in U.S. Pat. No. 7,177,092 is constituted by five lens units including, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power.

Generally, in order to achieve a zoom lens of a small total size while maintaining a high zoom ratio of a predetermined level, it may be useful to increase the refractive power (optical power=an inverse of the focal length) of each lens unit included in the zoom lens. However, in a zoom lens whose refractive power of each lens unit is high, aberrations may greatly vary during zooming. Accordingly, it becomes difficult to achieve a high optical performance for the entire variable magnification (zooming) range.

In the above-described four-unit zoom lens and the five-unit zoom lens, in order to achieve a high optical performance while maintaining a wide angle of view and a high zoom ratio even in a small-size lens system, it may be useful to move a plurality of lens units and an image sensor during zooming. However, it is difficult to achieve a zoom lens having a wide angle of view, a high zoom ratio, and a high optical performance at the same time merely by moving a plurality of lens units and an image sensor during zooming. In other words, it becomes particularly significant to appropriately set the refractive power of each lens unit and determine which lens unit to move during zooming.

More specifically, it is significant to appropriately set conditions for moving the third lens unit during zooming. Unless the configuration described above is appropriately set, it becomes difficult to achieve a zoom lens whose total size is small and having a wide angle of view, a high zoom ratio, and a high optical performance.

SUMMARY OF THE INVENTION

The present invention is directed to an image pickup apparatus including an optical system whose total size is small and having a wide angle of view, a high zoom ratio, and a high optical performance for the entire zooming range.

According to an aspect of the present invention, in an image pickup apparatus including an image sensor and a zoom lens configured to form an image on the image sensor, the zoom lens includes, in order from an object side to an image side, a first lens unit having a positive refractive power, a second lens unit having a negative refractive power, a third lens unit having a positive refractive power, and a subsequent lens group including one or more lens units. In the zoom lens, during zooming, the first lens unit is stationary, the third lens unit moves along a locus convex towards the object side, and three or more lens units including the third lens unit and the image sensor move. An optical total length of the zoom lens is longer at a telephoto end than at a wide-angle end.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B, and 2C are aberration charts of the zoom lens according to a numerical example 1, which corresponds to the first exemplary embodiment, at the wide-angle end, at the middle focal length, and at the telephoto end, respectively.

FIGS. 4A, 4B, and 4C are aberration charts of the zoom lens according to a numerical example 2, which corresponds to the second exemplary embodiment, at the wide-angle end, at the middle focal length, and at the telephoto end, respectively.

FIGS. 6A, 6B, and 6C are aberration charts of the zoom lens according to a numerical example 3, which corresponds to the third exemplary embodiment, at the wide-angle end, at the middle focal length, and at the telephoto end, respectively.

FIGS. 8A, 8B, and 8C are aberration charts of the zoom lens according to a numerical example 4, which corresponds to the fourth exemplary embodiment, at the wide-angle end, at the middle focal length, and at the telephoto end, respectively.

FIGS. 10A, 10B, and 10C are aberration charts of the zoom lens according to a numerical example 5, which corresponds to the fifth exemplary embodiment at the wide-angle end, at the middle focal length, and at the telephoto end, respectively.

DESCRIPTION OF THE EMBODIMENTS

Figure 1A:
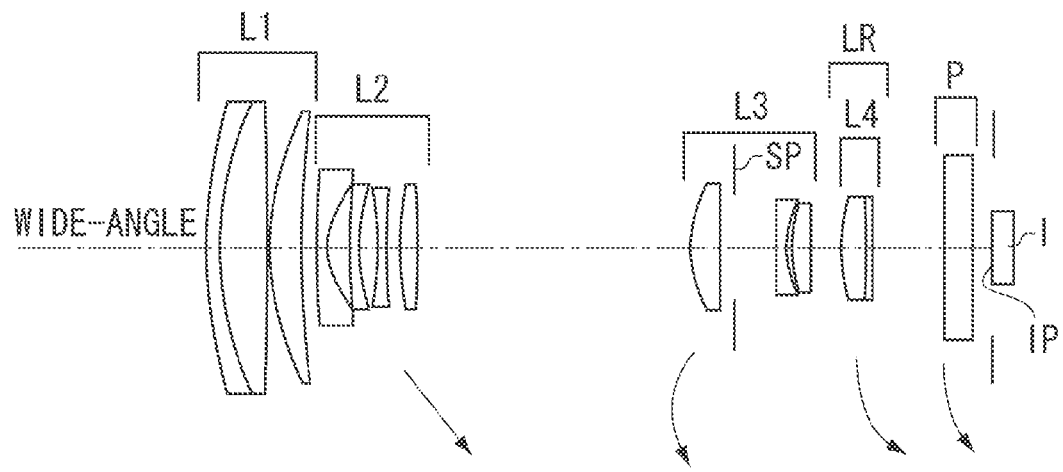
FIGS. 1A, 1B, and 1C are lens cross sections of a zoom lens according to a first exemplary embodiment of the present invention at the wide-angle end, at a middle focal length, and at the telephoto end, respectively.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is illustrative in nature and is in no way intended to limit the invention, its application, or uses.

Processes, techniques, apparatus, and materials considered to be known to a person of ordinary skill in the relevant art may not be discussed in detail for the sake of brevity, but are intended to be part of the enabling description where appropriate. For example the fabrication of the lens elements and their materials is not discussed in detail herein, but it is considered that a person of ordinary skill in the art would be familiar with those details.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

An image pickup apparatus according to an exemplary embodiment of the present invention includes an image sensor I and a zoom lens configured to form an image on the image sensor I. Furthermore, the optical total length of the zoom lens is longer at the telephoto end than at the wide-angle end.

The zoom lens includes, in order from the object side to the image side and arranged along an optical axis thereof, a first lens unit L1 having a positive refractive power, a second lens unit L2 having a negative refractive power, a third lens unit L3 having a positive refractive power, and a subsequent lens group LR including one or more lens units. During zooming, the first lens unit L1 is stationary while the third lens unit L3 moves along a locus convex towards the object side. Furthermore, three or more lens units, which includes the third lens unit L3, and the image sensor I move during zooming.

Figure 1B:
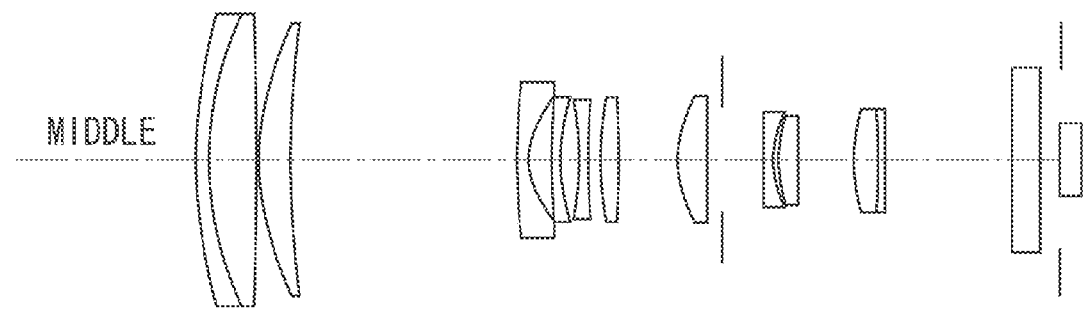
Figure 1C:
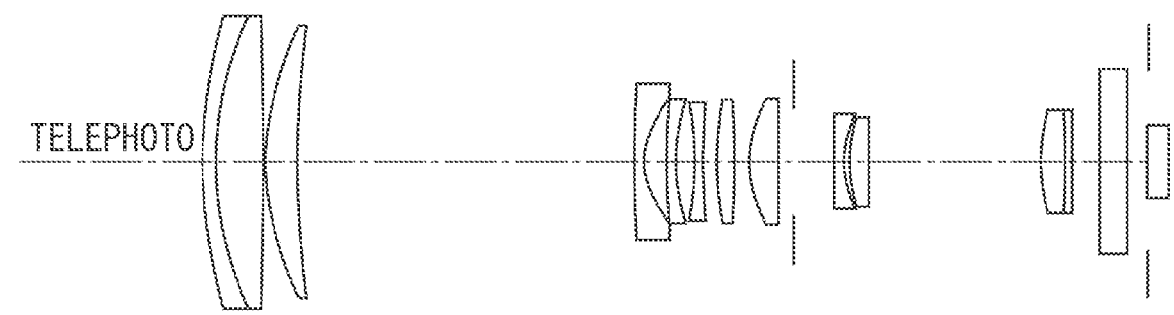

FIGS. 1A, 1B, and 1C are lens cross sections of a zoom lens according to a first exemplary embodiment of the present invention at the wide-angle end (short focal length end), at a middle focal length, and at the telephoto end (long focal length end), respectively.

Figure 2C:
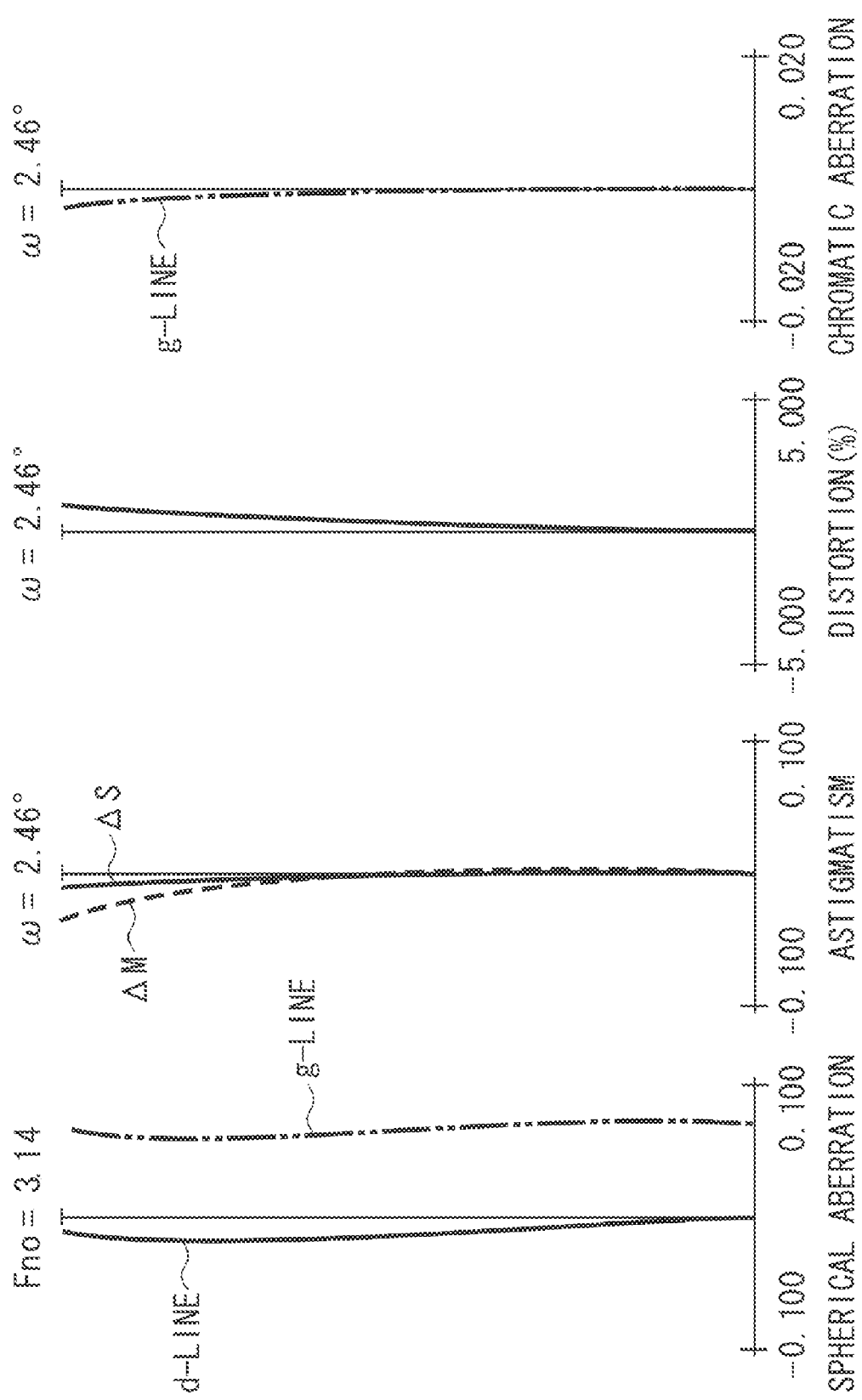

FIGS. 2A, 2B, and 2C are aberration charts of the zoom lens according to the first exemplary embodiment at the wide-angle end, at the middle focal length, and at the telephoto end, respectively.

Figure 3A:
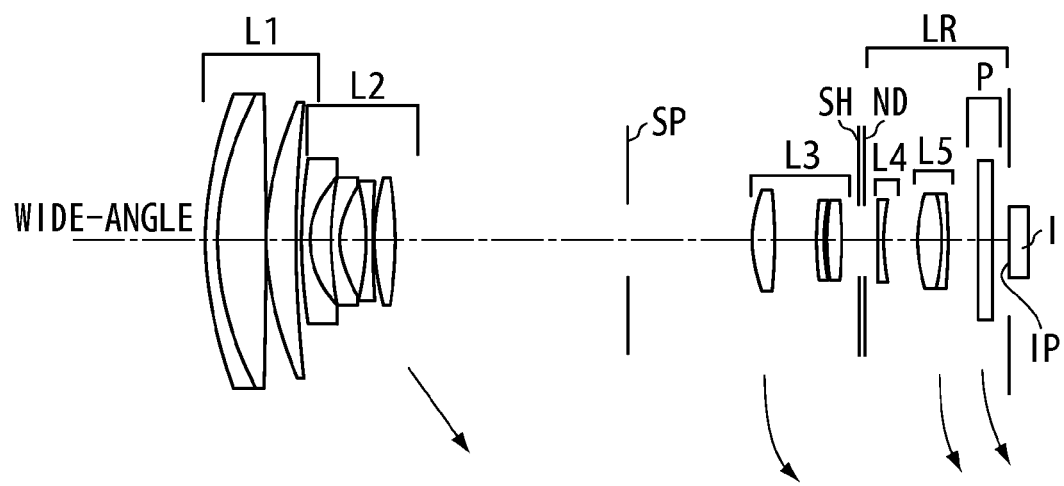
FIGS. 3A, 3B, and 3C are lens cross sections of a zoom lens according to a second exemplary embodiment of the present invention at the wide-angle end, at a middle focal length, and at the telephoto end, respectively.
Figure 3B:
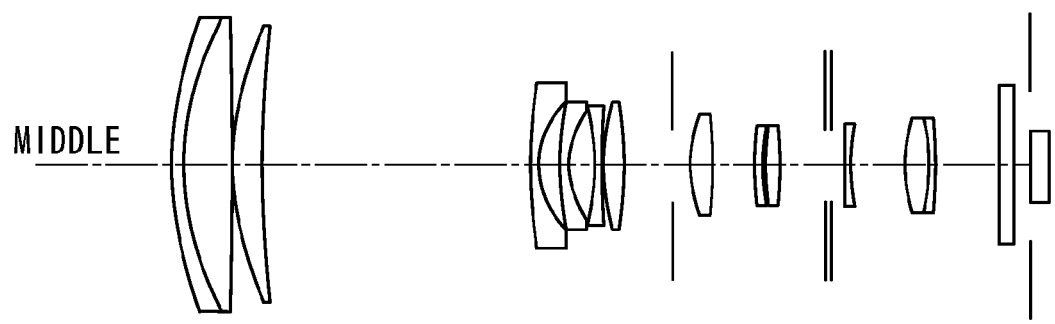
Figure 3C:
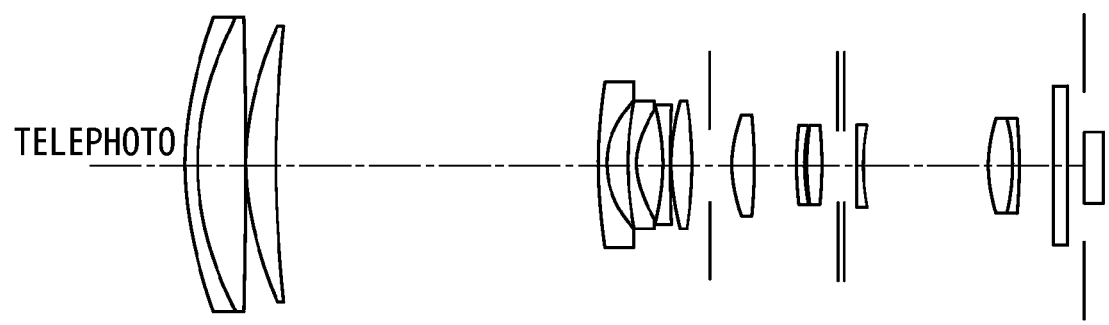

FIGS. 3A, 3B, and 3C are lens cross sections of a zoom lens according to a second exemplary embodiment of the present invention at the wide-angle end, at a middle focal length, and at the telephoto end, respectively.

Figure 4B:
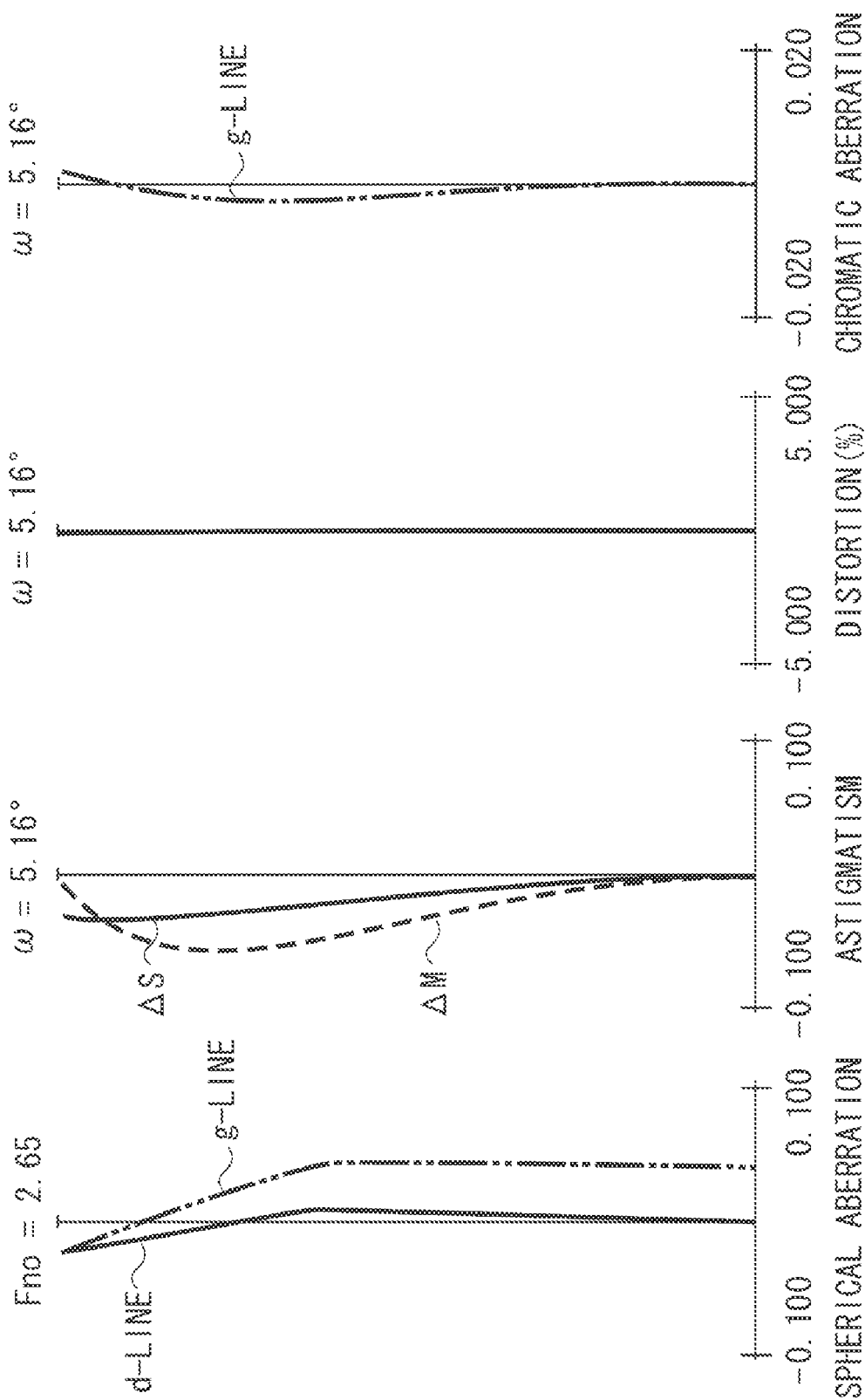
Figure 4C:
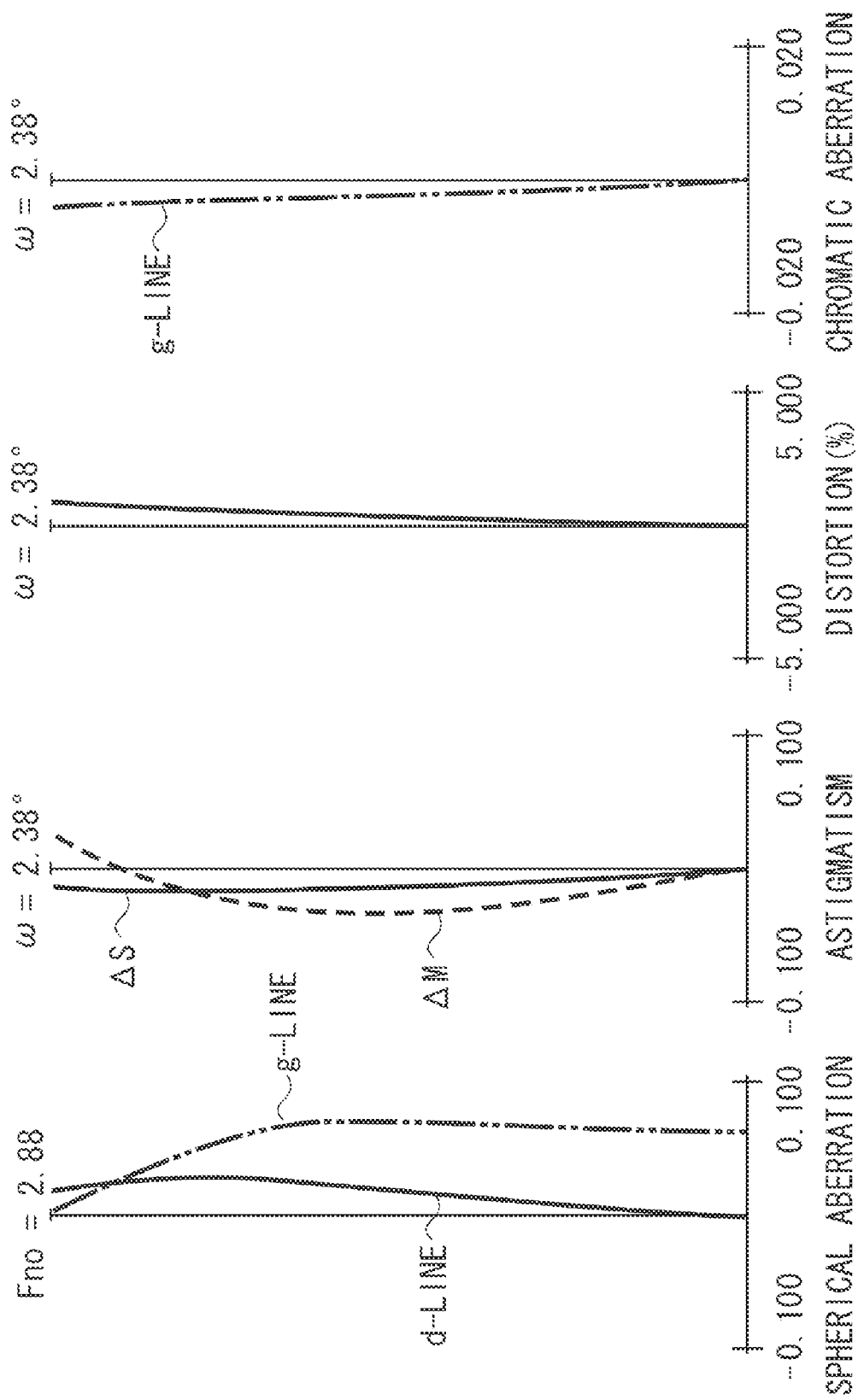

FIGS. 4A, 4B, and 4C are aberration charts of the zoom lens according to the second exemplary embodiment at the wide-angle end, at the middle focal length, and at the telephoto end, respectively.

Figure 5A:
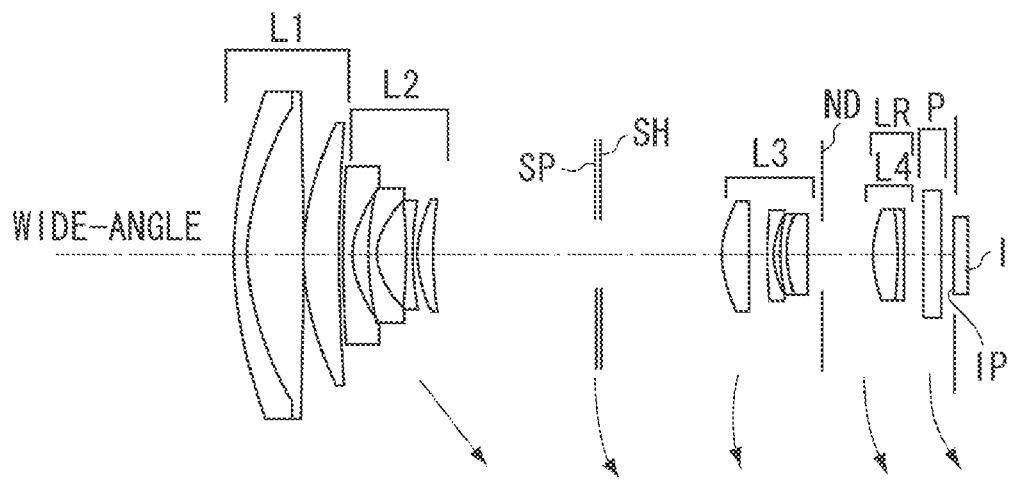
FIGS. 5A, 5B, and 5C are lens cross sections of a zoom lens according to a third exemplary embodiment of the present invention at the wide-angle end, at a middle focal length, and at the telephoto end, respectively.
Figure 5B:
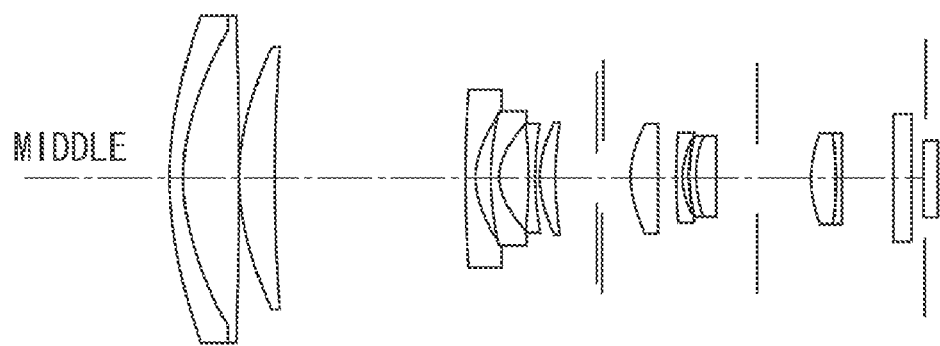
Figure 5C:
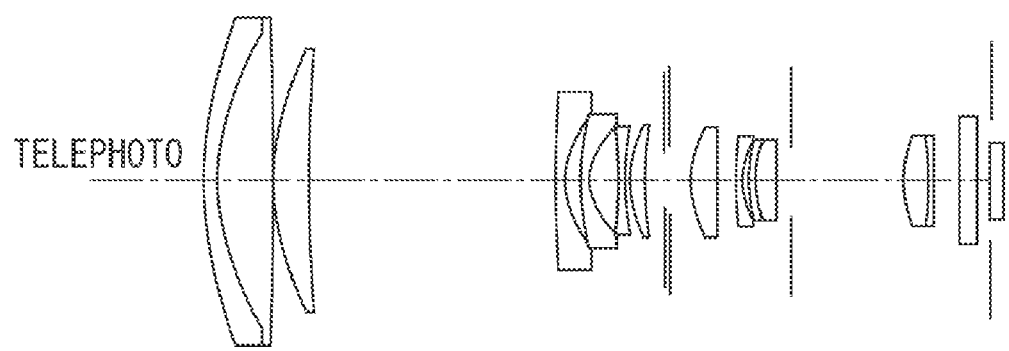

FIGS. 5A, 5B, and 5C are lens cross sections of a zoom lens according to a third exemplary embodiment of the present invention at the wide-angle end, at a middle focal length, and at the telephoto end, respectively.

FIGS. 6A, 6B, and 6C are aberration charts of the zoom lens according to the third exemplary embodiment at the wide-angle end, at the middle focal length, and at the telephoto end, respectively.

Figure 7A:
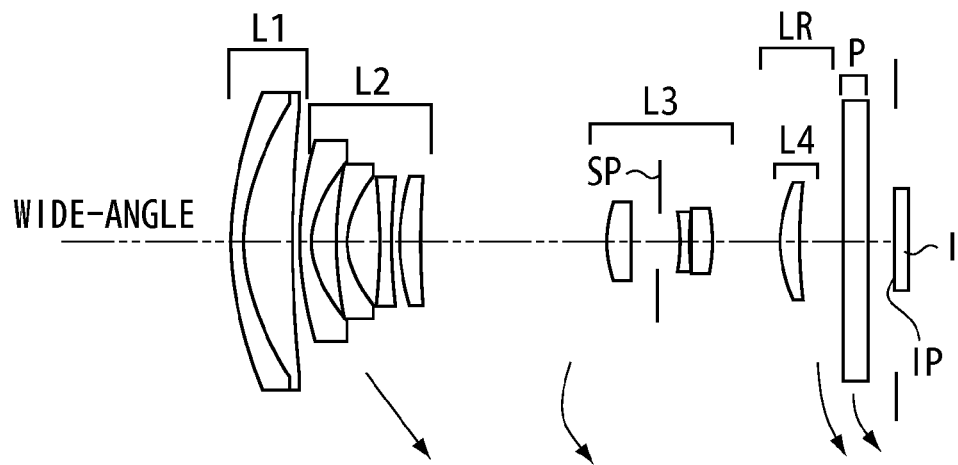
FIGS. 7A, 7B, and 7C are lens cross sections of a zoom lens according to a fourth exemplary embodiment of the present invention at the wide-angle end, at a middle focal length, and at the telephoto end, respectively.
Figure 7B:
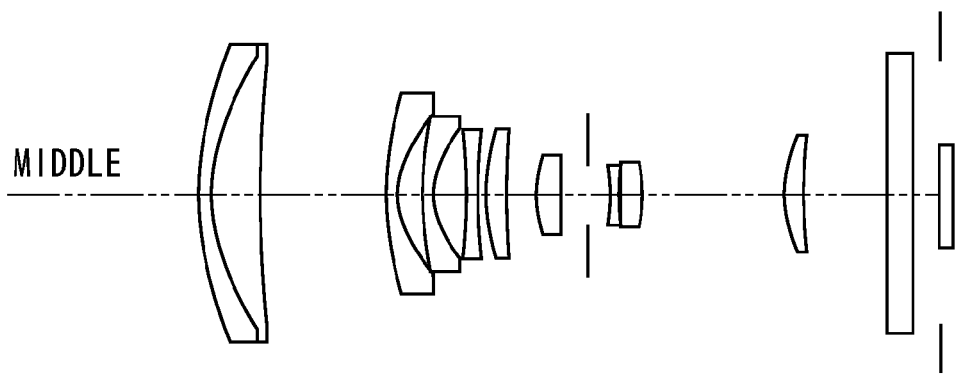
Figure 7C:
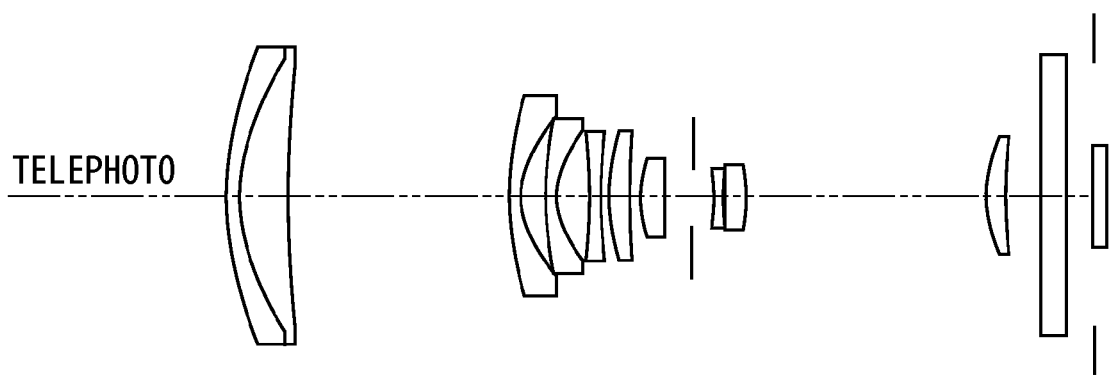

FIGS. 7A, 7B, and 7C are lens cross sections of a zoom lens according to a fourth exemplary embodiment of the present invention at the wide-angle end, at a middle focal length, and at the telephoto end, respectively.

Figure 8A:
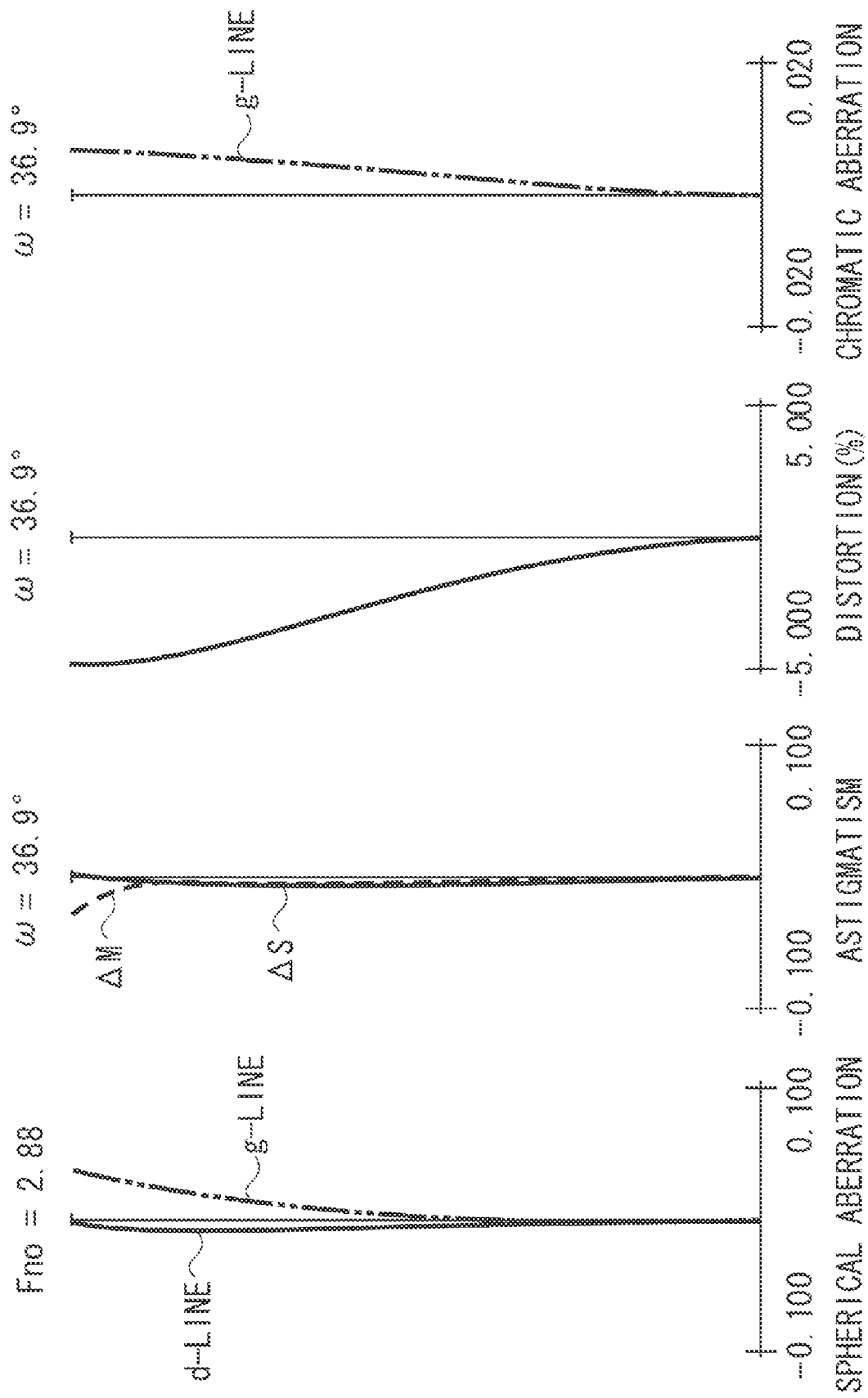
Figure 8B:
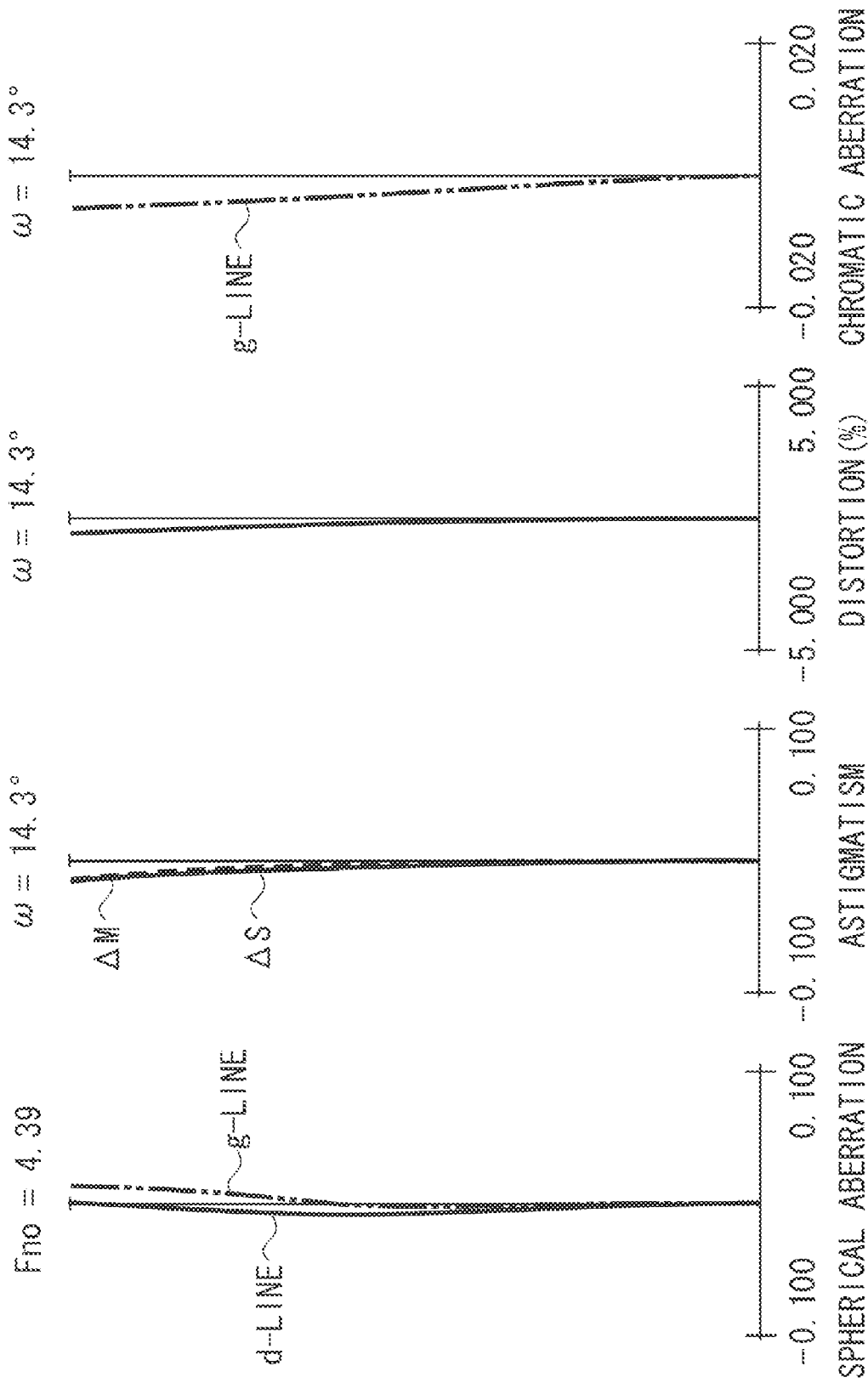

FIGS. 8A, 8B, and 8C are aberration charts of the zoom lens according to the fourth exemplary embodiment at the wide-angle end, at the middle focal length, and at the telephoto end, respectively.

Figure 9A:
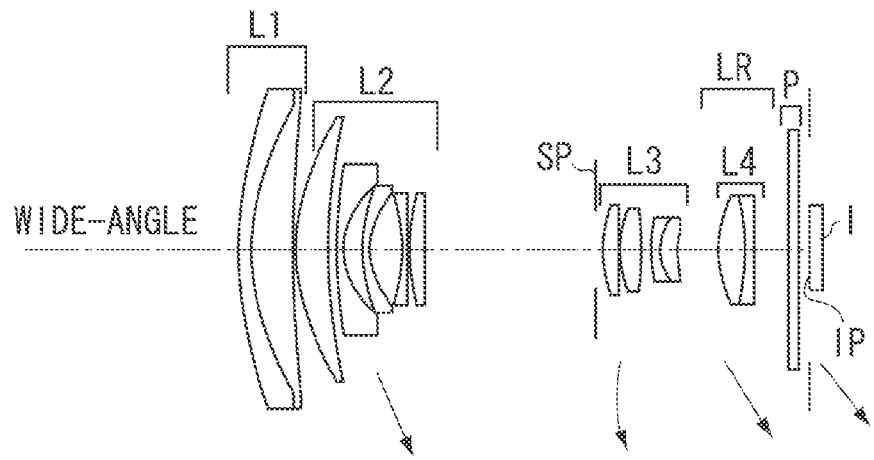
FIGS. 9A, 9B, and 9C are lens cross sections of a zoom lens according to a fifth exemplary embodiment of the present invention at the wide-angle end, at a middle focal length, and at the telephoto end, respectively.
Figure 9B:
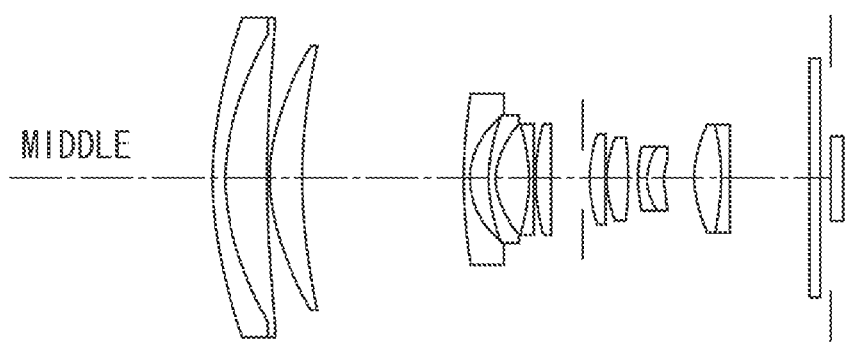
Figure 9C:
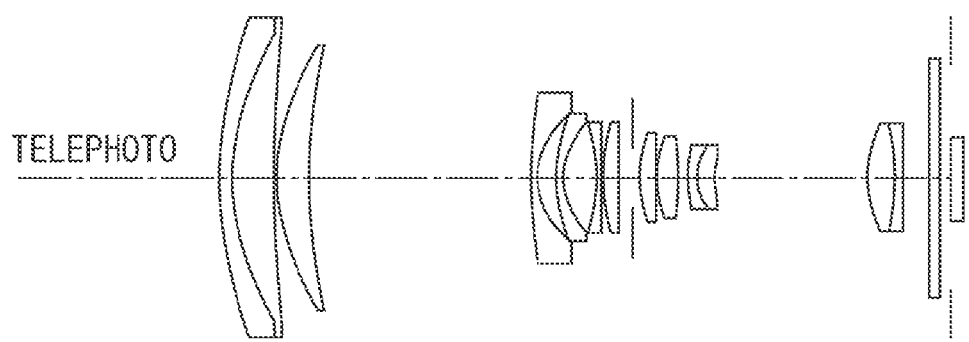

FIGS. 9A, 9B, and 9C are lens cross sections of a zoom lens according to a fifth exemplary embodiment of the present invention at the wide-angle end, at a middle focal length, and at the telephoto end, respectively.

Figure 10A:
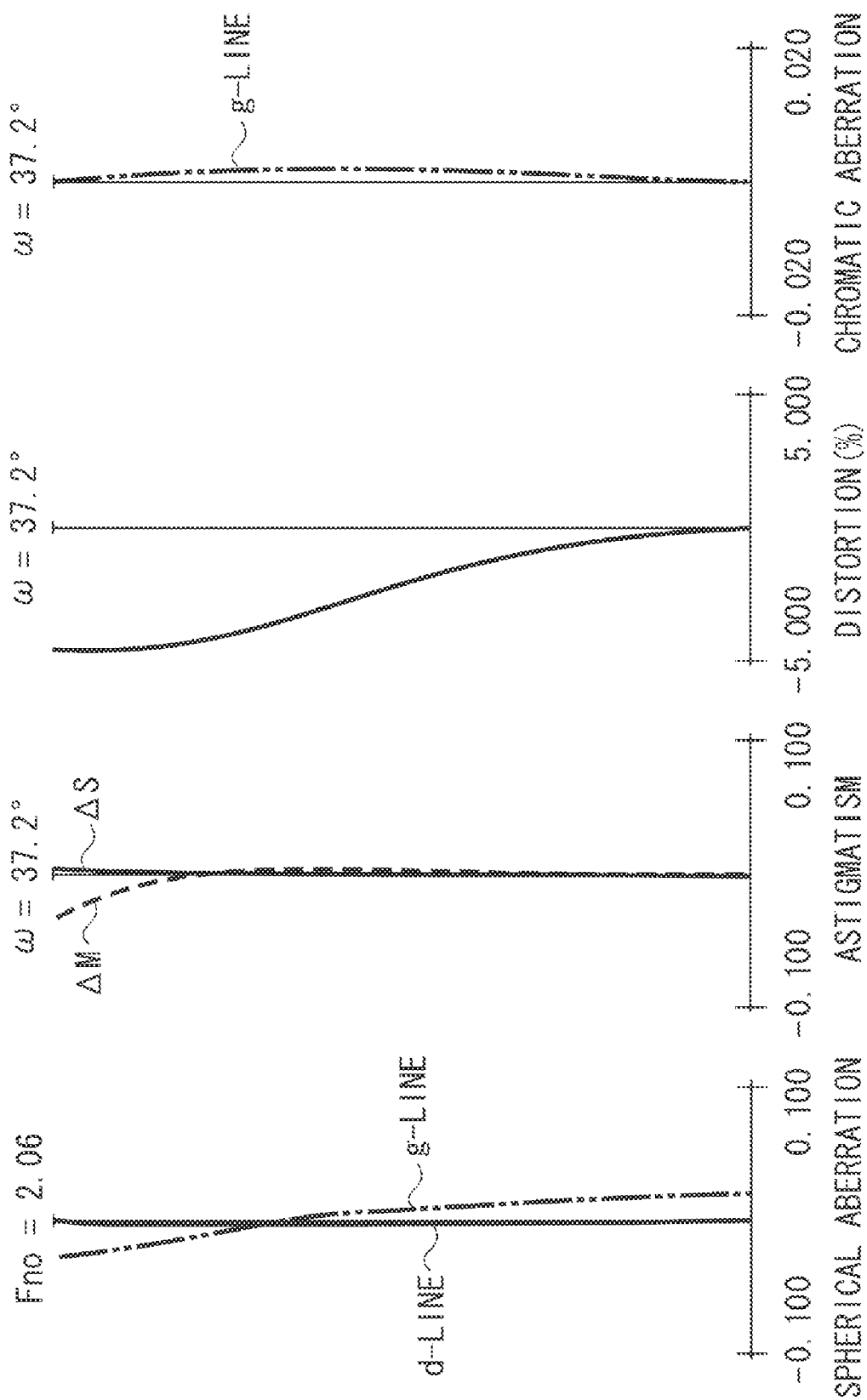
Figure 10B:
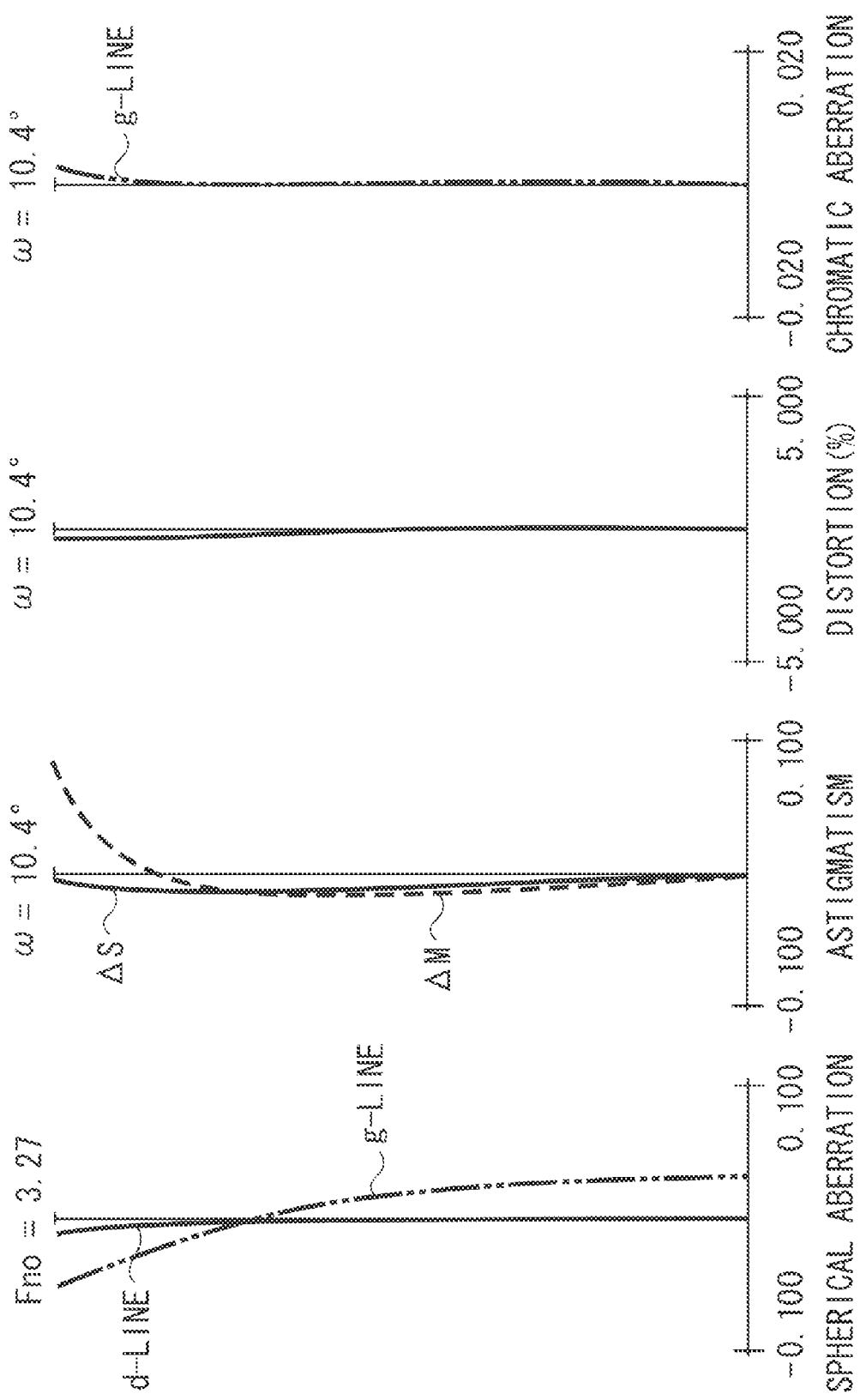

FIGS. 10A, 10B, and 10C are aberration charts of the zoom lens according to the fifth exemplary embodiment at the wide-angle end, at the middle focal length, and at the telephoto end, respectively.

Figure 11:
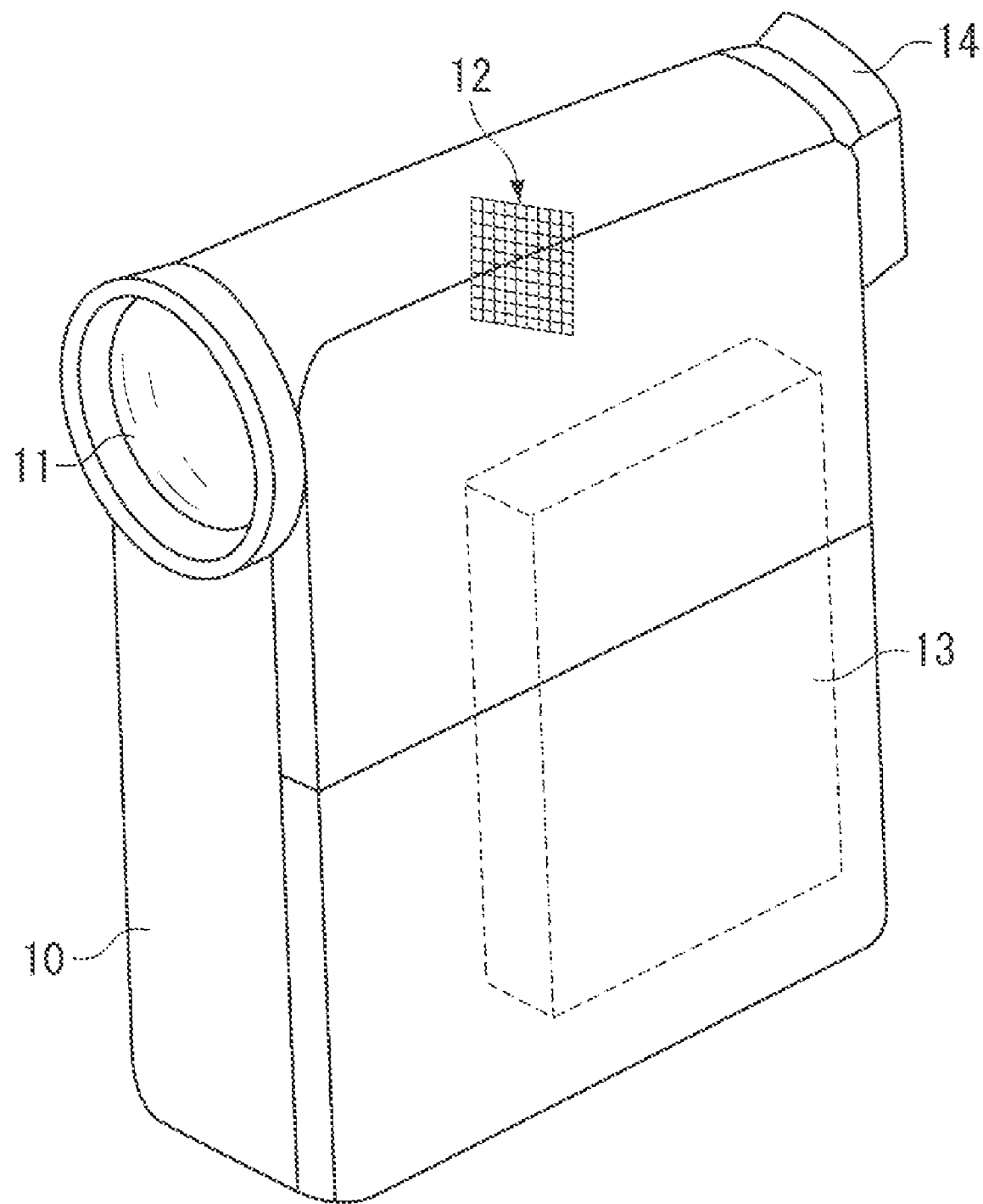
FIG. 11 illustrates main components of an image pickup apparatus according to an exemplary embodiment of the present invention.

FIG. 11 illustrates main components of a video camera (image pickup apparatus) having the zoom lens according to an exemplary embodiment of the present invention. Each exemplary embodiment implements an image pickup apparatus, such as a video camera or a digital camera.

In each of the diagrams showing a cross section of the zoom lens (FIGS. 1A through 1C, 3A through 3C, 5A through 5C, 7A through 7A, and 9A through 9C), an object side (front side) is shown at the left-hand portion of the drawing, and an image side (rear side) is shown at the right-hand portion thereof. Furthermore, in each of the diagrams showing a cross section of the zoom lens (FIGS. 1A through 1C, 3A through 3C, 5A through 5C, 7A through 7A, and 9A through 9C), "i" denotes an order of a lens unit from the object side. "Li" denotes an i-th lens unit. "LR" denotes a rear lens unit (subsequent lens group), which includes one or more lens units.

"SP" denotes an aperture stop (light amount adjustment device), which is provided between the second lens unit L2 and the third lens unit L3 or within the third lens unit L3. "P" denotes an optical block, such as an optical filter, a faceplate, a crystal low-pass filter, or an infrared-ray cut filter. "SH" denotes a shutter. "ND" denotes a neutral density (ND) filter, which can enter and exit from the optical path.

"IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element) I, such as a charge-coupled device (CCD) sensor or a complementary metal-oxide semiconductor (CMOS) sensor.

In each of the diagrams showing a cross section of the zoom lens (FIGS. 1A through 1C, 3A through 3C, 5A through 5C, 7A through 7A, and 9A through 9C), an arrow, either curved or linear, denotes a locus of movement of each lens unit during zooming from the wide-angle end to the telephoto end.

In each of the aberration charts (FIGS. 2A through 2C, 4A through 4C, 6A through 6C, 8A through 8C, and 10A through 10C), "d-LINE" and "g-LINE" respectively denote d-line and g-line light. "ΔM" and "ΔS" respectively denote a meridional image plane and a sagittal image plane. Chromatic aberration of magnification is represented with respect to g-line light. "ω" denotes a half angle of view. "Fno" denotes an F-number.

In each of the following exemplary embodiments, each of the wide-angle end and the telephoto end refers to a zooming position when a lens unit for variable magnification is positioned at each of the ends of a range in which the magnification varying lens unit can mechanically move along the optical axis.

In the zoom lens according to an exemplary embodiment of the present invention, the first lens unit L1 is stationary during zooming in order to effectively capture a high-quality moving image. Furthermore, to effectively achieve a zoom lens having a wide angle of view and a high zoom ratio, the zoom lens according to an exemplary embodiment of the present invention includes, in order from the object side to the image side and arranged along the optical axis of the zoom lens, the first lens unit L1 having a positive refractive power, the second lens unit L2 having a negative refractive power, the third lens unit L3 having a positive refractive power, and the rear lens unit LR including one or more lens units.

During zooming, the third lens unit L3 moves along a locus convex towards the object side. Accordingly, an off-axial ray becomes incident to a front lens at a middle focal length (middle zoom position) at a low height of incidence. With the configuration like this, the zoom lens according to an exemplary embodiment of the present invention can easily reduce the effective diameter of the front lens.

However, because the moving locus of the third lens unit L3 during zooming is restricted, the zoom lens according to an exemplary embodiment of the present invention moves the magnification varying lens unit and a lens unit that corrects variation of the curvature of field that may occur during variable magnification in the direction of the optical axis as well as the third lens unit L3. In addition, the image sensor I is moved according to variation on the image plane, which may occur during variable magnification.

The zoom lens according to each exemplary embodiment is constituted by four or more lens units in total. In addition, during zooming, three or more lens units and the image sensor I are moved in the direction of the optical axis. Furthermore, the optical total length of the zoom lens (the distance from the first lens surface to the image plane) is longer at the telephoto end than at the wide-angle end. Accordingly, the zoom lens according to an exemplary embodiment of the present invention can easily and effectively execute variable magnification with the optical system having the short total length.

In addition, the distance from the first lens surface (the lens surface closest to the object side) to the aperture stop SP is longer at the telephoto end than at the wide-angle end. In other words, in the zoom lens according to an exemplary embodiment of the present invention, the aperture stop SP is located at a position closer to the object side at the wide-angle end than at the telephoto end. Accordingly, the zoom lens according to an exemplary embodiment of the present invention can effectively prevent unnecessary light from becoming incident to the optical system at an intermediate image height. In addition, with the above-described configuration, the zoom lens according to an exemplary embodiment of the present invention can easily reduce the effective diameter of the front lens by causing the off-axial ray to become incident to the front lens at a low height of incidence.

Moreover, in each exemplary embodiment, at least one lens surface of the positive lens in the third lens unit L3 has an aspheric shape. Because the third lens unit L3 has a positive refractive power, the refractive power of the positive lens in the third lens unit L3 becomes intense. Accordingly, a large amount of aberration may occur. In order to prevent this problem, the zoom lens according to each exemplary embodiment, in which at least one lens surface of the positive lens in the third lens unit L3 has an aspheric shape, can effectively correct various aberrations, such as spherical aberration, which may occur at the wide-angle end.

In each exemplary embodiment, the focal lengths (f1, f2, f3) of the first lens unit L1, the second lens unit L2, and the third lens unit L3, respectively, satisfy at least one of the following mathematical conditions:

$$0.25 < f3/f1 < 0.50 \quad (1)$$

$$0.33 < |f2/f3| < 0.64 \quad (2).$$

The mathematical condition (1) provides a condition for the ratio of the focal lengths (refractive powers) of the first lens unit L1 and the third lens unit L3. If the upper limit value of the condition (1) is exceeded, then the share of the refractive power of the first lens unit L1, of the refractive power of the entire optical system, becomes very high. In this case, it becomes difficult to effectively correct various aberrations that may occur in the first lens unit L1, in particular, axial chromatic aberration occurring at the telephoto end. On the other hand, if the lower limit value of the condition (1) is exceeded, the principal point position of the entire optical system at the telephoto end shifts towards the image side. Accordingly, the total length of the optical system may become very long.

The condition (2) provides a condition for the ratio of the focal lengths of the second lens unit L2 and the third lens unit L3. If the upper limit value of the condition (2) is exceeded, it becomes difficult to effectively correct spherical aberration that may occur at the wide-angle end. In addition, because the amount of movement of the second lens unit L2 during zooming increases in this case, the total length of the optical system may increase. On the other hand, if the lower limit value of the condition (2) is exceeded, then it becomes difficult to effectively correct astigmatic at the wide-angle end. Moreover, because the entrance pupil position at the wide-angle end becomes distant from the light-incident surface, the effective diameter of the front lens may become large.

It is further useful if the ranges of the values in the conditions (1) and (2) are altered as follows:

$$0.26 < f3/f1 < 0.42 \tag{1a}$$

$$0.41 < |f2/f3| < 0.62 \tag{2a}.$$

In addition, during zooming, each exemplary embodiment changes the interval between the lens unit located closest to the image plane, of those included in the rear lens unit LR, and the image sensor. Accordingly, each exemplary embodiment can effectively reduce variations of curvature of field and chromatic aberration of magnification that may occur during zooming and can effectively reduce the variation on the image plane.

A lens configuration of each lens unit of the zoom lens according to each exemplary embodiment will be described in detail below. Referring to FIGS. 1A through 1C, the zoom lens according to the first exemplary embodiment includes the first lens unit L1 having a positive refractive power, the second lens unit L2 having a negative refractive power, the third lens unit L3 having a positive refractive power, and the rear lens unit LR, which includes a fourth lens unit L4 having a positive refractive power. In other words, the first exemplary embodiment is a positive-lead type four-unit zoom lens.

In the example illustrated in FIGS. 1A through 1C, the first lens unit L1 is stationary during zooming. During zooming from the wide-angle end to the telephoto end, the second through the fourth lens units move in the direction indicated by a corresponding arrow, respectively. More specifically, the second lens unit L2 moves towards the image side. The third lens unit L3 moves along a locus convex towards the object side. The fourth lens unit L4 moves towards the image side. The aperture stop SP moves integrally with the third lens unit L3. The image sensor I moves towards the image side (rightward in the drawing). The focusing is implemented by moving the fourth lens unit L4 or the image sensor I.

In the following description, each lens unit includes its constituent lenses in the following order from the object side to the image side. More specifically, the first lens unit L1 includes a negative lens, a positive lens, and a positive lens. The second lens unit L2 includes a negative lens, a negative lens, a negative lens, and a positive lens. The third lens unit L3 includes a positive lens, a negative lens, and a positive lens. The fourth lens unit L4 includes a positive lens and a negative lens.

In the lens cross section illustrated in FIGS. 3A through 3C, the zoom lens according to the second exemplary embodiment includes the first lens unit L1 having a positive refractive power, the second lens unit L2 having a negative refractive power, the third lens unit L3 having a positive refractive power, and the rear lens unit LR, which includes the fourth lens unit L4 having a negative refractive power and a fifth lens unit L5 having a positive refractive power. In other words, the second exemplary embodiment is a positive-lead type five-unit zoom lens.

Referring to FIGS. 3A through 3C, in the zoom lens according to the second exemplary embodiment, the first lens unit L1 and the fourth lens unit L4 are stationary during zooming. During zooming from the wide-angle end to the telephoto end, the second, the third, and the fifth lens unit move as indicated by each corresponding arrow, respectively.

More specifically, the second lens unit L2 moves towards the image side. The third lens unit L3 moves along a locus convex towards the object side. The fifth lens unit moves towards the image side. The aperture stop SP moves towards the image side independently from the other lens units. The image sensor I moves towards the image side. Focusing is implemented by moving the fifth lens unit L5 or the image sensor I along the optical axis.

In the second exemplary embodiment, the first through the third lens units have the same configuration as that of the first exemplary embodiment described above. The fourth lens unit L4 includes a negative lens. The fifth lens unit L5 includes a positive lens and a negative lens.

Referring to FIGS. 5A through 5C, the zoom lens according to the third exemplary embodiment is a four-unit zoom lens of the same zoom type as that of the first exemplary embodiment. The zoom lens according to the third exemplary embodiment is different from the zoom lens according to the first exemplary embodiment in the following points. In other words, in the third exemplary embodiment, unlike the first exemplary embodiment, the aperture stop SP and the shutter SH are provided at locations between the second lens unit L2 and the third lens unit L3 and are moved independently from the other lens units during zooming. In addition, unlike the first exemplary embodiment, the zoom lens according to the third exemplary embodiment moves the ND filter ND, which is provided on the image side of the third lens unit L3, integrally with the third lens unit L3 during zooming.

The third lens unit L3 includes a positive lens, a negative lens, a negative lens, and a positive lens. Focusing is implemented by moving the fourth lens unit L4 or the image sensor I. The other configurations of the third exemplary embodiment are the same as those of the first exemplary embodiment.

Referring to FIGS. 7A through 7C, the zoom lens according to the fourth exemplary embodiment is a four-unit zoom lens of the same zoom type as that of the first exemplary embodiment. More specifically, the zoom lens according to the fourth exemplary embodiment is different from the first exemplary embodiment in the lens configurations of the first and the fourth lens units.

To paraphrase this, in the fourth exemplary embodiment, the first lens unit L1 includes a negative lens and a positive lens. The fourth lens unit L4 includes a positive lens. Focusing is implemented by moving the fourth lens unit L4 or the image sensor I. The other configurations are the same as those of the first exemplary embodiment.

Referring to FIGS. 9A through 9C, the zoom lens according to the fifth exemplary embodiment is a four-unit zoom lens of the same zoom type as that of the first exemplary embodiment. However, the zoom lens according to the fifth exemplary embodiment is different from the first exemplary embodiment in the following points. To paraphrase this, in the fifth exemplary embodiment, the aperture stop SP is provided at a location between the second lens unit L2 and the third lens unit L3 and is moved integrally with the third lens unit L3 during zooming.

In the fifth exemplary embodiment, the third lens unit L3 includes a positive lens, a positive lens, a negative lens, and a positive lens. Focusing is implemented by moving the fourth lens unit L4 or the image sensor I. The other configurations of the fifth exemplary embodiment are the same as those of the first exemplary embodiment.

In each exemplary embodiment, for the aperture stop (the light amount adjustment device) SP, either of the aperture stop, the shutter mechanism SH, and the ND filter ND is exclusively provided. Alternatively, the aperture stop, the shutter mechanism SH, and the ND filter ND are provided in combination for the light amount adjustment device SP.

If the shutter SH and the ND filter ND are provided at a location different from the location of the aperture stop or the light amount adjustment device SP on the optical path as in the second and the third exemplary embodiments, it is not always required to provide the shutter SH and the ND filter ND. In each exemplary embodiment, the ND filter ND can be provided at both locations of the aperture stop (or the light amount adjustment device SP) and the shutter SH.

In each exemplary embodiment, if focusing is implemented by moving the image sensor, wobbling (minute vibration) for contrast autofocus (AF) can be implemented by the lens unit. On the other hand, if focusing is implemented by moving the lens unit, wobbling for contrast AF can be implemented by the image sensor.

Numerical examples 1 through 5, which respectively correspond to the first through the fifth exemplary embodiments of the present invention, are set forth below. In each of the numerical examples 1 through 5, "i" (where i=1, 2, 3 . . . ) denotes the order of a surface from the object side, "ri" denotes a radius of curvature of an i-th optical surface (the i-th lens surface), "di" denotes an axial space between the i-th surface and the (i+1)-th surface, "ndi" and "vdi" respectively denote a refractive index and an Abbe number of the material of the i-th optical member with respect to d-line light.

In addition, each of "K", "A4", "A5", "A6", "A7", "A8", "A9", and "A10" denotes an aspheric coefficient for each corresponding order. The aspheric shape is expressed as $$X = (H^2/R)/[1+\{1-(1+K)(H/R)^2\}^{1/2}] + A4 \cdot H^4 + A5 \cdot H^5 + A6 \cdot H^6 + A7 \cdot H^7 + A8 \cdot H^8 + A9 \cdot H^9 + A10 \cdot H^{10}$$

where "X" denotes a displacement from a surface vertex along the optical axis in a position at a height "H" from the optical axis, and "R" denotes a paraxial radius of curvature. The scientific notation "e±XX" for each aspheric coefficient is equivalent to the exponential notation "×10$^{\pm XX}$". An asterisk ("*") next to the surface number denotes an aspheric surface. The relationship between each condition described above and each numerical example is set forth in Table 1. The focal length, the F-number, and the angle of view are represented with a value acquired when focusing on an infinitely-distant object, respectively. The back focus "BF" is expressed by an air-equivalent value of a distance from the last lens surface to the image plane. The last two surfaces are surfaces of a glass block, such as a filter.

Numerical Example 1

| Unit: mm | | | | |
|---|---|---|---|---|
| Surface Data | | | | |
| Surface No. | r | d | nd | vd |
| 1 | 46.197 | 1.10 | 1.80518 | 25.4 |
| 2 | 27.805 | 4.11 | 1.48749 | 70.2 |
| 3 | −639.098 | 0.20 | | |
| 4 | 26.373 | 2.76 | 1.60311 | 60.6 |
| 5 | 87.627 | Variable | | |
| 6 | 68.867 | 0.90 | 1.88300 | 40.8 |
| 7 | 7.484 | 1.92 | | |
| 8 | 48.670 | 0.80 | 1.83400 | 37.2 |
| 9 | 15.474 | 1.54 | | |
| 10 | −21.083 | 0.80 | 1.74400 | 44.8 |
| 11 | 152.156 | 0.99 | | |
| 12 | 23.465 | 1.64 | 1.92286 | 18.9 |
| 13 | −89.545 | Variable | | |
| 14* | 9.274 | 2.63 | 1.58313 | 59.4 |
| 15* | −288.493 | 1.24 | | |
| 16 (Stop) | ∞ | 3.52 | | |
| 17 | 78.525 | 0.80 | 1.84666 | 23.9 |
| 18 | 8.159 | 0.40 | | |
| 19 | 11.203 | 1.78 | 1.80400 | 46.6 |
| 20 | −87.259 | Variable | | |
| 21* | 13.924 | 2.00 | 1.58313 | 59.4 |
| 22 | −96.643 | 0.70 | 1.92286 | 18.9 |
| 23 | 12233.548 | Variable | | |
| 24 | ∞ | 2.38 | 1.51633 | 64.1 |
| 25 | ∞ | 1.63 | | |
| Image plane | ∞ | | | |

| Aspheric Coefficients | |
|---|---|
| r14 | K = −7.55754e−001 A4 = 2.19064e−005 A6 = 1.16938e−006 A8 = −1.86853e−008 |
| r15 | K = −1.70532e+003 A4 = 3.18065e−005 A6 = 9.73064e−007 A8 = −2.70362e−008 |
| r21 | K = 4.30952e+000 A4 = −2.39083e−004 A6 = −9.53736e−007 A8 = −1.177566−007 |

| Various Data | | |
|---|---|---|
| Zoom Ratio 13.72 | | |
| | Wide-angle end | Middle Focal Length | Telephoto end |
| Focal Length | 5.10 | 23.59 | 69.95 |
| F-number | 1.85 | 2.81 | 3.14 |
| Angle of View | 30.47 | 7.25 | 2.46 |
| Image Height | 3.00 | 3.00 | 3.00 |
| Lens Total Length | 66.09 | 72.83 | 79.68 |
| BF | 9.36 | 14.29 | 5.69 |
| d5 | 1.25 | 19.28 | 28.61 |
| d13 | 23.09 | 4.87 | 1.06 |
| d20 | 2.56 | 4.56 | 14.49 |
| d23 | 6.16 | 11.09 | 2.49 |

| Various Data of Each Unit | | |
|---|---|---|
| Lens unit | First surface | Focal length |
| 1 | 1 | 43.98 |
| 2 | 6 | −8.28 |
| 3 | 14 | 17.42 |
| 4 | 21 | 25.99 |
| 5 | 24 | ∞ |

Numerical Example 2

Unit: mm

Surface Data

| Surface No. | r | d | nd | vd |
|---|---|---|---|---|
| 1 | 55.253 | 1.75 | 2.00069 | 25.5 |
| 2 | 39.845 | 6.20 | 1.49700 | 81.5 |
| 3 | −1552.738 | 0.20 | | |
| 4 | 42.719 | 3.75 | 1.60311 | 60.6 |
| 5 | 133.123 | Variable | | |
| 6 | 89.992 | 1.10 | 1.88300 | 40.8 |
| 7 | 11.839 | 2.84 | | |
| 8 | 59.599 | 0.90 | 1.84666 | 23.9 |
| 9 | 12.057 | 3.79 | | |
| 10 | −23.709 | 0.80 | 1.83481 | 42.7 |
| 11 | 200.118 | 0.10 | | |
| 12 | 29.455 | 3.00 | 1.92286 | 18.9 |
| 13 | −38.878 | Variable | | |
| 14 (Stop) | ∞ | Variable | | |
| 15* | 14.230 | 3.15 | 1.58313 | 59.4 |
| 16* | −105.520 | 5.65 | | |
| 17 | 82.788 | 0.70 | 1.84666 | 23.9 |
| 18 | 13.314 | 0.38 | | |
| 19 | 19.886 | 2.20 | 1.71300 | 53.9 |
| 20 | −33.781 | Variable | | |
| 21 | ∞ | 0.60 | | |
| 22 | ∞ | 1.95 | | |
| 23 | 416.826 | 0.70 | 1.48749 | 70.2 |
| 24 | 30.733 | Variable | | |
| 25 | 16.298 | 3.25 | 1.71300 | 53.9 |
| 26 | −22.586 | 0.70 | 1.84666 | 23.9 |
| 27 | −339.548 | Variable | | |
| 28 | ∞ | 1.94 | 1.51633 | 64.1 |
| 29 | ∞ | 2.00 | | |
| 30 | ∞ | 0.00 | | |
| Image plane | ∞ | | | |

Aspheric Coefficients r15  K = −6.90664e−001 A5 = −3.93291e−008 A7 = −4.98565e−008
     A9 = −4.26333e−010
r16  K = −2.19665e+002 A5 = 6.85141e−007 A7 = −8.23653e−008

Various Data
Zoom Ratio 18.00

| | Wide-angle end | Middle Focal Length | Telephoto end |
|---|---|---|---|
| Focal Length | 4.64 | 38.45 | 83.57 |
| F-number | 1.85 | 2.65 | 2.88 |
| Angle of View | 36.78 | 5.16 | 2.38 |
| Image Height | 3.47 | 3.47 | 3.47 |
| Lens Total Length | 105.66 | 112.97 | 118.47 |
| BF | 7.39 | 12.16 | 8.15 |
| d5 | 0.90 | 35.52 | 43.01 |
| d13 | 30.70 | 6.36 | 1.99 |
| d14 | 16.25 | 2.11 | 2.82 |
| d20 | 2.24 | 6.11 | 2.27 |
| d24 | 4.46 | 7.00 | 16.51 |
| d27 | 4.10 | 8.88 | 4.86 |

Various Data of Each Unit

| Lens unit | First surface | Focal length |
|---|---|---|
| 1 | 1 | 65.00 |
| 2 | 6 | −10.57 |
| 3 | 14 | ∞ |
| 4 | 15 | 21.12 |
| 5 | 21 | −68.10 |
| 6 | 25 | 24.65 |
| 7 | 28 | ∞ |

Numerical Example 3

Unit: mm

Surface Data

| Surface No. | r | d | nd | vd |
|---|---|---|---|---|
| 1 | 54.640 | 1.80 | 2.00069 | 25.5 |
| 2 | 34.577 | 6.89 | 1.49700 | 81.5 |
| 3 | −812.948 | 0.20 | | |
| 4 | 34.217 | 4.19 | 1.69680 | 55.5 |
| 5 | 144.255 | Variable | | |
| 6 | 122.143 | 1.00 | 1.69680 | 55.5 |
| 7 | 12.086 | 2.31 | | |
| 8 | 35.693 | 0.80 | 1.69680 | 55.5 |
| 9 | 8.726 | 3.65 | | |
| 10 | −66.571 | 0.80 | 1.77250 | 49.6 |
| 11 | 27.287 | 0.68 | | |
| 12 | 15.678 | 1.89 | 1.92286 | 18.9 |
| 13 | 42.596 | Variable | | |
| 14 (Stop) | ∞ | 0.70 | | |
| 15 | ∞ | Variable | | |
| 16* | 12.052 | 3.48 | 1.85996 | 40.3 |
| 17* | −274.243 | 2.32 | | |
| 18 | 133.251 | 0.80 | 1.84666 | 23.9 |
| 19 | 9.810 | 0.67 | | |
| 20 | 17.032 | 0.80 | 1.84666 | 23.9 |
| 21 | 10.734 | 0.00 | | |
| 22 | 10.734 | 2.78 | 1.71300 | 53.9 |
| 23 | −57.402 | Variable | | |
| 24 | ∞ | Variable | | |
| 25* | 15.599 | 3.00 | 1.85996 | 40.3 |
| 26 | −28.000 | 0.70 | 1.92286 | 18.9 |
| 27 | −348.934 | Variable | | |
| 28 | ∞ | 2.38 | 1.51633 | 64.1 |
| 29 | ∞ | 1.63 | | |
| Image plane | ∞ | | | |

Aspheric Coefficients r16  K = −1.69151e−001 A4 = −1.86873e−005 A6 = 4.64592e−008
     A8 = 4.26211e−011
r17  K = 3.77584e+002 A4 = 3.91154e−005
r25  K = −1.09690e+000 A4 = 2.87914e−005 A6 = 1.34795e−007
     A8 = −9.47750e−010

Various Data
Zoom Ratio 15.00

| | Wide-angle end | Middle Focal Length | Telephoto end |
|---|---|---|---|
| Focal Length | 4.03 | 23.54 | 60.40 |
| F-number | 1.44 | 2.81 | 3.00 |
| Angle of View | 36.68 | 7.26 | 2.84 |
| Image Height | 3.00 | 3.00 | 3.00 |
| Lens Total Length | 89.51 | 93.79 | 97.95 |
| BF | 5.59 | 9.65 | 6.34 |
| d5 | 0.67 | 24.00 | 31.14 |
| d13 | 20.38 | 5.44 | 2.49 |
| d15 | 15.07 | 3.52 | 2.49 |
| d23 | 1.82 | 4.96 | 1.82 |
| d24 | 6.52 | 6.75 | 14.22 |
| d27 | 2.39 | 6.45 | 3.14 |

-continued

Unit: mm

Various Data of Each Unit

| Lens unit | First surface | Focal length |
|---|---|---|
| 1 | 1 | 50.39 |
| 2 | 6 | −8.26 |
| 3 | 14 | ∞ |
| 4 | 16 | 18.99 |
| 5 | 24 | ∞ |
| 6 | 25 | 18.04 |
| 7 | 28 | ∞ |

Numerical Example 4

Unit: mm

Surface Data

| Surface No. | r | d | nd | vd |
|---|---|---|---|---|
| 1 | 25.484 | 1.10 | 1.84666 | 23.9 |
| 2 | 17.456 | 3.70 | 1.77250 | 49.6 |
| 3 | 94.999 | Variable | | |
| 4 | 23.360 | 0.80 | 1.88300 | 40.8 |
| 5 | 7.975 | 2.00 | | |
| 6 | 29.815 | 0.80 | 1.88300 | 40.8 |
| 7 | 7.279 | 2.50 | | |
| 8 | −36.049 | 0.80 | 1.70154 | 41.2 |
| 9 | 43.357 | 0.58 | | |
| 10 | 14.511 | 1.60 | 1.92286 | 18.9 |
| 11 | 110.900 | Variable | | |
| 12* | 8.082 | 2.00 | 1.58313 | 59.4 |
| 13* | −34.575 | 2.01 | | |
| 14 (Stop) | ∞ | 1.67 | | |
| 15 | −13.537 | 0.60 | 1.84666 | 23.9 |
| 16 | 11.671 | 0.10 | | |
| 17 | 22.475 | 1.80 | 1.80400 | 46.6 |
| 18 | −8.649 | Variable | | |
| 19 | 10.694 | 1.31 | 1.51742 | 52.4 |
| 20 | 22.250 | Variable | | |
| 21 | ∞ | 1.94 | 1.51633 | 64.1 |
| 22 | ∞ | 2.00 | | |
| Image plane | ∞ | | | |

Aspheric Coefficients r12  K = −2.39986e+000 A4 = 7.41739e−004 A6 = 1.38513e−005
     A8 = 2.08760e−006 A10 = −3.31775e−008
r13  K = −7.59546e+001 A4 = 3.99860e−004 A6 = 3.09417e−005
     A8 = 1.68894e−006

Various Data
Zoom Ratio 4.91

| | Wide-angle end | Middle Focal Length | Telephoto end |
|---|---|---|---|
| Focal Length | 5.15 | 15.15 | 25.30 |
| F-number | 2.88 | 4.39 | 5.14 |
| Angle of View | 36.94 | 14.34 | 8.71 |
| Image Height | 3.88 | 3.88 | 3.88 |
| Lens Total Length | 49.63 | 55.48 | 64.97 |
| BF | 6.61 | 9.66 | 6.03 |
| d3 | 0.54 | 9.67 | 16.72 |
| d11 | 14.00 | 2.07 | 0.78 |
| d18 | 5.10 | 10.71 | 18.05 |
| d20 | 3.32 | 6.38 | 2.75 |

-continued

Unit: mm

Various Data of Each Unit

| Lens unit | First surface | Focal length |
|---|---|---|
| 1 | 1 | 46.33 |
| 2 | 4 | −7.42 |
| 3 | 12 | 12.51 |
| 4 | 19 | 38.31 |
| 5 | 21 | ∞ |

Numerical Example 5

Unit: mm

Surface Data

| Surface No. | r | d | nd | vd |
|---|---|---|---|---|
| 1 | 39.659 | 1.10 | 1.84666 | 23.9 |
| 2 | 23.546 | 3.90 | 1.59319 | 67.9 |
| 3 | 159.156 | 0.15 | | |
| 4 | 20.614 | 2.92 | 1.71300 | 53.9 |
| 5 | 51.116 | Variable | | |
| 6 | 36.111 | 0.70 | 1.88300 | 40.8 |
| 7 | 7.101 | 1.76 | | |
| 8 | 15.438 | 0.55 | 1.88300 | 40.8 |
| 9 | 7.132 | 2.90 | | |
| 10 | −14.390 | 0.55 | 1.69680 | 55.5 |
| 11 | −165.778 | 0.09 | | |
| 12 | 16.751 | 1.39 | 1.92286 | 18.9 |
| 13 | −519.915 | Variable | | |
| 14 (Stop) | ∞ | 0.50 | | |
| 15* | 8.074 | 1.63 | 1.58313 | 59.4 |
| 16* | −1504.407 | 0.22 | | |
| 17 | 12.968 | 1.70 | 1.65844 | 50.9 |
| 18 | −43.937 | 1.04 | | |
| 19 | 12.900 | 0.60 | 1.84666 | 23.9 |
| 20 | 3.757 | 1.62 | 1.58144 | 40.8 |
| 21 | 5.838 | Variable | | |
| 22 | 11.766 | 2.51 | 1.80400 | 46.6 |
| 23 | −18.223 | 0.60 | 1.84666 | 23.9 |
| 24 | 331.960 | Variable | | |
| 25 | ∞ | 0.80 | 1.51680 | 64.2 |
| 26 | ∞ | 1.00 | | |
| Image plane | ∞ | | | |

Aspheric Coefficients r15  K = −5.70826e−001 A4 = −2.07321e−004 A6 = 1.70493e−006
     A8 = −2.62012e−007 A10 = −8.12818e−008
r16  K = 1.07092e+005 A4 = 9.23547e−005 A6 = 3.99186e−006
     A8 = −5.54505e−007 A10 = 2.19557e−009

Various Data
Zoom Ratio 9.78

| | Wide-angle end | Middle Focal Length | Telephoto end |
|---|---|---|---|
| Focal Length | 4.74 | 19.60 | 46.36 |
| F-number | 2.06 | 3.27 | 3.50 |
| Angle of View | 37.22 | 10.41 | 4.44 |
| Image Height | 3.60 | 3.60 | 3.60 |
| Lens Total Length | 50.79 | 55.03 | 65.12 |
| BF | 4.76 | 8.88 | 4.06 |
| d5 | 0.66 | 14.25 | 19.65 |
| d13 | 15.25 | 2.78 | 1.29 |
| d21 | 3.68 | 2.69 | 13.67 |
| d24 | 3.23 | 7.35 | 2.53 |

-continued

Unit: mm

Various Data of Each Unit

| Lens unit | First surface | Focal length |
|---|---|---|
| 1 | 1 | 35.83 |
| 2 | 6 | −6.69 |
| 3 | 14 | 11.71 |
| 4 | 22 | 15.63 |
| 5 | 25 | ∞ |

TABLE 1

| | Numerical Example | | | | |
|---|---|---|---|---|---|
| Condition | 1 | 2 | 3 | 4 | 5 |
| (1) | 0.396 | 0.325 | 0.377 | 0.270 | 0.322 |
| (2) | 0.475 | 0.500 | 0.435 | 0.593 | 0.585 |

As described above, in each exemplary embodiment of the present invention, the first lens unit L1 is stationary during zooming while the image sensor and at least three lens units are moved in the direction of the optical axis. With the above-described configuration, each exemplary embodiment of the present invention can achieve a small-size image pickup apparatus having a wide angle of view, a high zoom ratio, and a high optical performance.

An exemplary embodiment of a video camera (image pickup apparatus) that uses the zoom lens according to each exemplary embodiment of the present invention as a photographic optical system thereof will be described below with reference to FIG. 11.

Referring to FIG. 11, the video camera includes a camera body 10 and a photographic optical system 11. The photographic optical system 11 includes an optical system according to any of the first through the fifth exemplary embodiments described above.

The camera body 10 includes an image sensor (solid-state image sensor) 12, such as a CCD sensor, configured to optically receive an object image formed by the photographic optical system 11.

The camera body 10 also includes a recording unit 13, which is configured to record information corresponding to an object image that has been received and photoelectrically converted by the solid-state image sensor 12. In addition, the camera body 10 also includes a viewfinder 14, via which a user of the video camera can observe an object image displayed on a display device (not illustrated). The display device includes a liquid crystal display (LCD) panel and displays the object image formed on the image sensor 12.

By applying the zoom lens according to each exemplary embodiment of the present invention to an image pickup apparatus, such as a video camera, the present invention can implement a small-size image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-089323 filed Apr. 8, 2010, which is hereby incorporated by reference herein in its entirety.

What is claimed is:

1. An image pickup apparatus including an image sensor and a zoom lens configured to form an image on the image sensor, the zoom lens includes, in order from an object side to an image side:

a first lens unit having a positive refractive power;
a second lens unit having a negative refractive power;
a third lens unit having a positive refractive power; and
a subsequent lens group including one or more lens units,
wherein, during zooming, the first lens unit is stationary, the third lens unit moves along a locus convex towards the object side, and three or more lens units including the third lens unit and the image sensor move, and
wherein an optical total length of the zoom lens is longer at a telephoto end than at a wide-angle end.

2. The image pickup apparatus according to claim 1, wherein the zoom lens further includes an aperture stop configured to move during zooming, and
wherein a distance from a lens surface closest to the object side to the aperture stop is longer at the telephoto end than at the wide-angle end.

3. The image pickup apparatus according to claim 1, wherein, when f1 and f3 are focal lengths of the first and the third lens units, respectively, the following condition is satisfied:

$0.25 < f3/f1 < 0.50.$

4. The image pickup apparatus according to claim 1, wherein, when f2 and f3 are focal lengths of the second and the third lens units, respectively, the following condition is satisfied:

$0.33 < |f2/f3| < 0.64.$

5. The image pickup apparatus according to claim 1, wherein, during zooming, an interval between a lens unit located closest to the image side, of lens units constituting the subsequent lens group, and the image sensor vary.

6. The image pickup apparatus according to claim 1, wherein the subsequent lens group consists of a fourth lens unit having a positive refractive power, and
wherein the second, the third, and the fourth lens units move during zooming.

7. The image pickup apparatus according to claim 1, wherein the subsequent lens group consists of, in order from the object side to the image side:

a fourth lens unit having a negative refractive power; and
a fifth lens unit having a positive refractive power, and
wherein the second, the third, and the fifth lens units move during zooming.

* * * * *